United States Patent
Kawai et al.

(10) Patent No.: US 10,504,322 B2
(45) Date of Patent: Dec. 10, 2019

(54) GAME APPARATUS AND A NON-TRANSITORY COMPUTER READABLE MEDIUM FOR PROVIDING A UNIQUE GAME FEATURE FOR EACH PLAYER IN A COMMON LOTTERY GAME

(71) Applicant: KONAMI DIGITAL ENTERTAINMENT CO., LTD., Tokyo (JP)

(72) Inventors: Norifumi Kawai, Tokyo (JP); Fumitaka Takeyama, Tokyo (JP); Shinya Suga, Tokyo (JP)

(73) Assignee: KONAMI DIGITAL ENTERTAINMENT CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/947,916

(22) Filed: Apr. 9, 2018

(65) Prior Publication Data

US 2018/0225910 A1 Aug. 9, 2018

Related U.S. Application Data

(63) Continuation of application No. PCT/JP2016/079320, filed on Oct. 3, 2016.

(30) Foreign Application Priority Data

Oct. 8, 2015 (JP) ................... 2015-200358

(51) Int. Cl.
*G07F 17/32* (2006.01)
*A63F 5/00* (2006.01)
(Continued)

(52) U.S. Cl.
CPC .............. *G07F 17/322* (2013.01); *A63F 5/00* (2013.01); *A63F 5/007* (2013.01); *A63F 13/213* (2014.09);
(Continued)

(58) Field of Classification Search
CPC ............... G07F 17/3209; G07F 17/322; G07F 17/3262; G07F 17/3283; G07F 17/329;
(Continued)

(56) References Cited

U.S. PATENT DOCUMENTS 6,227,969 B1 * 5/2001 Yoseloff .................... A63F 1/18
273/143 R
7,708,630 B2 * 5/2010 Nicely ...................... A63F 5/00
273/138.2
(Continued)

FOREIGN PATENT DOCUMENTS

JP 2007-117658 A 5/2007
JP 2008-043727 A 2/2008
(Continued)

OTHER PUBLICATIONS

Notification of Reason for Refusal for corresponding JP 2015-200358, dated Jul. 18, 2017.
(Continued)

*Primary Examiner* — William H McCulloch, Jr.
(74) *Attorney, Agent, or Firm* — Sughrue Mion, PLLC

(57) ABSTRACT

A game apparatus is configured to acquire a movement image of an operation result generation device that generates a physical operation result of selecting one or more physical regions from among a plurality of physical regions; display a moving image based on the acquired movement image; receive an operation input, from a player, of assigning one or more symbols on one or more physical regions among the plurality of physical regions; set a symbol in accordance with the operation input by the player, in one or more of the physical regions that are displayed in the acquired movement image; acquire information indicative of the operation
(Continued)

result of selecting the physical region; and generate a game result for the player based on the acquired information and setting content.

8 Claims, 27 Drawing Sheets

(51) Int. Cl.
    *A63F 13/213*      (2014.01)
    *A63F 13/63*      (2014.01)
    *A63F 13/45*      (2014.01)
    *A63F 13/80*      (2014.01)
    *A63F 13/53*      (2014.01)
    *A63F 5/04*      (2006.01)
    *A63F 9/24*      (2006.01)

(52) U.S. Cl.
    CPC .............. *A63F 13/45* (2014.09); *A63F 13/53* (2014.09); *A63F 13/63* (2014.09); *A63F 13/80* (2014.09); *G07F 17/3209* (2013.01); *G07F 17/329* (2013.01); *G07F 17/3213* (2013.01); *G07F 17/3262* (2013.01); *G07F 17/3283* (2013.01); *A63F 5/0005* (2013.01); *A63F 5/0094* (2013.01); *A63F 5/045* (2013.01); *A63F 5/046* (2013.01); *A63F 2009/2435* (2013.01); *A63F 2009/2457* (2013.01); *G07F 17/3297* (2013.01)

(58) Field of Classification Search
    CPC .... G07F 17/3213; G07F 17/3297; A63F 5/00; A63F 5/007; A63F 5/0094; A63F 5/045; A63F 5/046
    See application file for complete search history.

(56) References Cited

U.S. PATENT DOCUMENTS

| | | | | |
|---|---|---|---|---|
| 9,183,697 B2* | 11/2015 | Kido | ................... | G07F 17/3211 |
| 9,672,684 B2* | 6/2017 | Kido | ................... | G07F 17/3211 |
| 9,821,218 B2* | 11/2017 | Elias | ..................... | G07F 17/329 |
| 2004/0053661 A1* | 3/2004 | Jones | ..................... | G07F 17/32 |
| | | | | 463/16 |
| 2006/0046823 A1* | 3/2006 | Kaminkow | ............. | G07F 17/32 |
| | | | | 463/16 |
| 2007/0075490 A1* | 4/2007 | Gak | ..................... | A63F 3/00157 |
| | | | | 273/146 |
| 2008/0242393 A1* | 10/2008 | Kido | ................... | G07F 17/3211 |
| | | | | 463/17 |
| 2012/0122545 A1* | 5/2012 | Watkins | .............. | G07F 17/3211 |
| | | | | 463/20 |
| 2013/0029741 A1* | 1/2013 | Kuhn | .................. | G07F 17/3225 |
| | | | | 463/17 |
| 2013/0059647 A1* | 3/2013 | Nicely | .................. | G07F 17/322 |
| | | | | 463/25 |
| 2014/0187306 A1* | 7/2014 | Nordahl | ............. | G07F 17/3202 |
| | | | | 463/17 |
| 2016/0155296 A1* | 6/2016 | Baron | ................. | G07F 17/3244 |
| | | | | 463/25 |
| 2016/0217657 A1* | 7/2016 | Halter | ................. | G07F 17/3258 |
| 2017/0228976 A1* | 8/2017 | Chesworth | .......... | G07F 17/3227 |
| 2017/0330415 A1* | 11/2017 | Sato | .................... | G07F 17/3209 |

FOREIGN PATENT DOCUMENTS

| | | |
|---|---|---|
| JP | 2008-245870 A | 10/2008 |
| JP | 2009-011819 A | 1/2009 |
| JP | 2011-088019 A | 5/2011 |
| JP | 2014-000175 A | 1/2014 |
| JP | 2015-126830 A | 7/2015 |

OTHER PUBLICATIONS

Decision to Grant a Patent for corresponding JP 2015-200358, dated Dec. 5, 2017.
International Search Report for PCT/JP2016/079320, dated Dec. 27, 2016.
Written Opinion in Application No. PCT/JP2016/079320 dated Dec. 27, 2016.
International Search Report in Application No. PCT/JP2016/079320 dated Dec. 27, 2016.
Communication dated Mar. 6, 2019, from the State Intellectual Property Office of People's Republic of China in counterpart Application No. 201680058713.0.
Notification to Grant Patent Right for Invention dated Jul. 24, 2019, from the State Intellectual Property Office of People's Republic of China in counterpart Application No. 201680058713.0.

* cited by examiner

LOCAL GAME NO. 1

LOCAL GAME NO. 2

LOCAL GAME NO. 3

COMMON BINGO GAME

FIRST COMMON ROULETTE GAME

COMPETITION GAME

| STATE, TYPE, ETC. | CENTRAL PART (412) | INNER RING PART (414) | OUTER RING PART (416) | SIDE PART (418) |
|---|---|---|---|---|
| BEFORE START (GUIDANCE TIME) | 0 | 0 | 0 | 0 |
| LOCAL GAME (IN LOTTERY) | −1 | 0 | 0 | 0 |
| COMMON BINGO GAME (IN LOTTERY) | −1 | 0 | 0 | 0 |
| COMPETITION GAME (IN LOTTERY) | −1 | 0 | 0 | 0 |
| FIRST COMMON ROULETTE GAME (IN LOTTERY) | +1 | 0 | 0 | 0 |
| SECOND COMMON ROULETTE GAME (IN LOTTERY) | +1 | 0 | +1 | 0 |
| SECOND COMMON ROULETTE GAME (JACKPOT WIN TIME) | +2 | 0 | +2 | −1 |

412  414  416  418

412  414  416  418

412  414  416  418

418  416  414  412

418  416  414  412

418  416  414  412

CAPTURED MOVING IMAGE

+

CG

=

SYNTHESIZED MOVING IMAGE

CAPTURED MOVING IMAGE

+

CG

=

SYNTHESIZED MOVING IMAGE

CAPTURED MOVING IMAGE

+

CG

=

SYNTHESIZED MOVING IMAGE

CAPTURED MOVING IMAGE

+

CG

=

SYNTHESIZED MOVING IMAGE

GAME APPARATUS AND A
NON-TRANSITORY COMPUTER READABLE
MEDIUM FOR PROVIDING A UNIQUE
GAME FEATURE FOR EACH PLAYER IN A
COMMON LOTTERY GAME

CROSS REFERENCE TO RELATED
APPLICATIONS

This application is a Continuation Application of PCT Application No. PCT/JP2016/079320, filed Oct. 3, 2016, and is based on and claims priority from Japanese Patent Application No. 2015-200358, filed Oct. 8, 2015, the entire contents of each of which are incorporated herein by reference.

BACKGROUND OF THE INVENTION

Field of the Invention

The present invention relates to a game apparatus and to a computer program.

Description of the Related Art

There is a game apparatus in which a physical lottery device is shared by a plurality of players (See Japanese Patent Application Laid-Open Publication No. 2011-88019). In a case in which a physical lottery device is shared by a plurality of players, when a physical lottery is being executed for one player, other players have to wait and standby for the start of another lottery even if other players satisfy an execution condition for a physical lottery.

In order to reduce such lottery standby, it is conceivable for a lottery to be executed collectively and concurrently at each predetermined time for one or more players satisfying an execution condition for a physical lottery. This way of executing a lottery, however, has a problem in that a physical lottery unique to each individual player of course cannot be provided.

SUMMARY OF THE INVENTION

In one aspect, a game apparatus according to the present invention includes: a moving image acquirer configured to acquire a movement image of an operation result generation device that generates a physical operation result used in a game; a moving image display device configured to display a moving image based on the movement image acquired by the moving image acquirer; an input receiver configured to receive an operation input by a player; an attribute setter configured to set an attribute in accordance with the operation input by the player, at least in a partial region of the movement image acquired by the moving image acquirer; a result information acquirer configured to acquire information indicative of the physical operation result; and a game result generator configured to generate a game result for the player based on the information acquired by the result information acquirer and the attribute set by the attribute setter.

DESCRIPTION OF THE EMBODIMENTS

Embodiments of the present invention will be described with reference to drawings.

Below, for convenience, description will be given in the following order: an overall configuration of a game system including a game apparatus; respective elements of the system; an overall flow of a game in the system; individual examples of games; and characteristic parts of the game system and the game apparatus.

Figure 1:
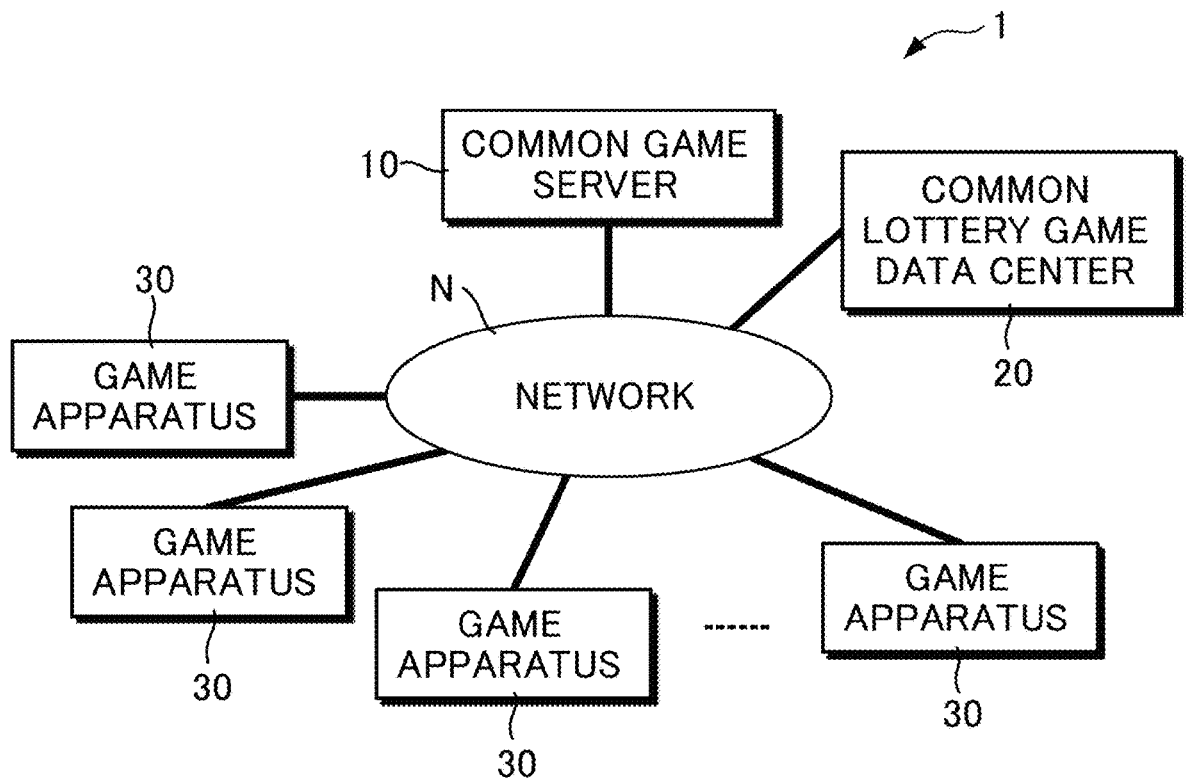
FIG. 1 is a diagram showing an overall configuration of a game system.

FIG. 1 is a diagram showing a configuration of a game system including a game apparatus according to an embodiment.

As shown in the figure, a game system 1 is configured to include, for example, a common game server 10, a common lottery game data center 20, and a plurality of game apparatuses 30, and these elements are connected to one another via a network N. The game apparatuses 30 are disposed in facilities, such as a game venue, a casino, a shopping center, etc. The game apparatus 30 may also be referred to as a gaming machine when used in a casino. Respective ones of the plurality of game apparatuses 30 may be disposed in one same facility, or may be disposed in different facilities. The network N may be, for example, the Internet, or may be a dedicated network, a virtual private network (VPN), a local network, or the like. The network may be either wired or wireless.

In the example in the figure, the common game server 10 and the common lottery game data center 20 are devices separate from each other. However, the common game server 10 and the common lottery game data center 20 may be integrated into a single device, or they may be configured such that while being divided into two or more devices, the two or more devices virtually look as if they were a single device when seen from the outside.

As will be described later, the game apparatus 30 as referred to herein is constituted by a single housing and one station, or two or more stations, that are provided attached to the housing. One player plays a game at one station.

Games executed in the game system 1 include a local game that is executed such that a result of the game is independent for each of the plurality of game apparatuses 30, a common game that is executed such that results of the game are related to each other among all or some of the plurality of game apparatuses 30, etc. An example of the common game may be a competition game executed among all or some of the plurality of game apparatuses 30. Details of the local game and the common game will be described later.

The common game server 10 is an example of a game progress control apparatus, and in the progress of the local game and the common game, controls each of the common lottery game data center 20 and the plurality of game apparatuses 30.

Figure 2:
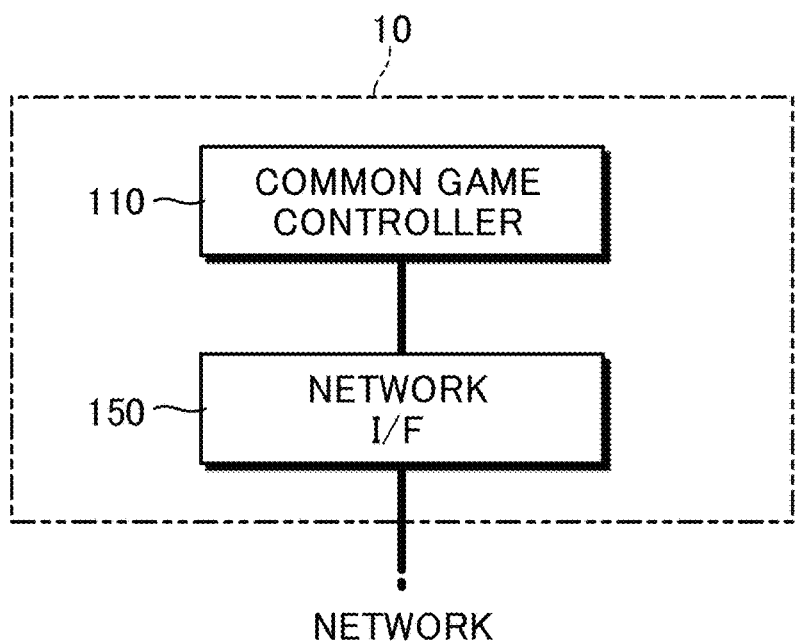
FIG. 2 is a block diagram showing a configuration of a common game server of the game system.

FIG. 2 is a block diagram showing a configuration of the common game server 10.

As shown in the figure, the common game server 10 includes a common game controller 110 and a network interface (I/F) 150. Details of control by the common game server 10 will be described later. The network I/F 150 communicates with each of the common lottery game data center 20 and the plurality of game apparatuses 30 via the network N.

Figure 3:
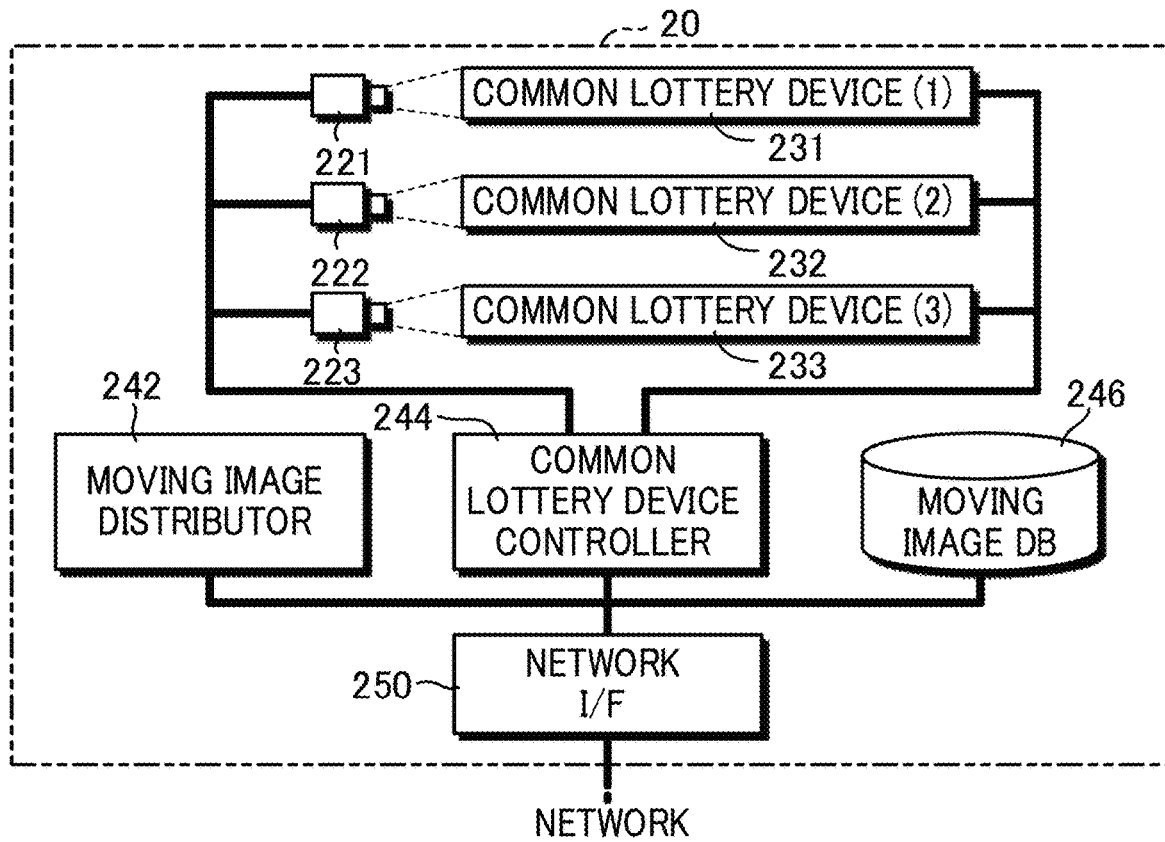
FIG. 3 is a block diagram showing a configuration of a common lottery game data center of the game system.

FIG. 3 is a block diagram showing a configuration of the common lottery game data center 20. As shown in the figure, the common lottery game data center 20 includes cameras 221 to 223, common lottery devices 231 to 233, a moving image distributor 242, a common lottery device controller 244, a moving image database (abbreviated as "moving image DB" in the FIG. 246, and a network I/F 250. In the figure, numbers in parentheses (1) to (3) are assigned respectively to the common lottery devices 231 to 233 to facilitate distinguishing therebetween.

In the game system 1, the local game is executed such that a result of the game is independent for each of the plurality of game apparatuses 30. The common game is executed such that results of the game are related to each other among all or some of the plurality of game apparatuses 30, utilizing movement images stored either in the common lottery devices 231 to 233 or in the moving image database 246.

Each of the common lottery devices 231 to 233 is a device that has a physical lottery mechanism, and a configuration of the lottery mechanism differs for each of the common lottery devices 231 to 233. For example, the common lottery devices 231 to 233 have roulette-type lottery mechanisms that have wheel surfaces that differ from one another. A physical lottery mechanism means a mechanism that executes a lottery by physical movement. In the case of a roulette-type lottery mechanism, the lottery is executed by physical movement of rotation of a roulette wheel and spinning of a ball that is fed into the roulette wheel. Examples of the common lottery devices 231 to 233 will be described after a local lottery device 330 is described, for convenience of explanation.

The camera 221 captures a lottery situation of the common lottery device 231. In the case of a roulette-type lottery mechanism, the camera 221 captures a moving image showing a view of lottery operation realized by rotation of a roulette wheel and spinning of a ball. Similarly, the camera 222 captures a lottery situation of the common lottery device 232, and the camera 223 captures a lottery situation of the common lottery device 233. The common lottery device controller 244 controls the cameras 221 to 223, the common lottery devices 231 to 233, etc.

The moving image database 246 stores in advance movement images showing lottery situations of the common lottery devices 231 to 233 that have been captured separately. These movement images are stored in the moving image database 246 in association with lottery information including moving image IDs for identifying different movement images, lottery results (positions of pockets into which balls have fallen), types of the common lottery devices 231 to 233, etc.

The moving image distributor 242 distributes the movement images captured by the cameras 221 to 223 to the plurality of game apparatuses 30. In the game apparatus 30, in order to reduce frequency of displaying the same movement image repeatedly (reusing), it is preferable that a large number (e.g., several thousands) of movement images be stored in the moving image database 246. Since reducing the frequency of reusing a movement image in the game apparatus 30 is able to reduce repeated display of the same movement image, it is possible to make it appear to a player as if a physical lottery were being executed in real time. It is of note that a movement image may be reused by providing a condition, such as prohibiting to display the same moving image again during a predetermined time period after the latest display, or within a predetermined number of lottery operations.

The network I/F 250 communicates with the common game server 10 and the plurality of game apparatuses 30 via the network N.

Figure 4:
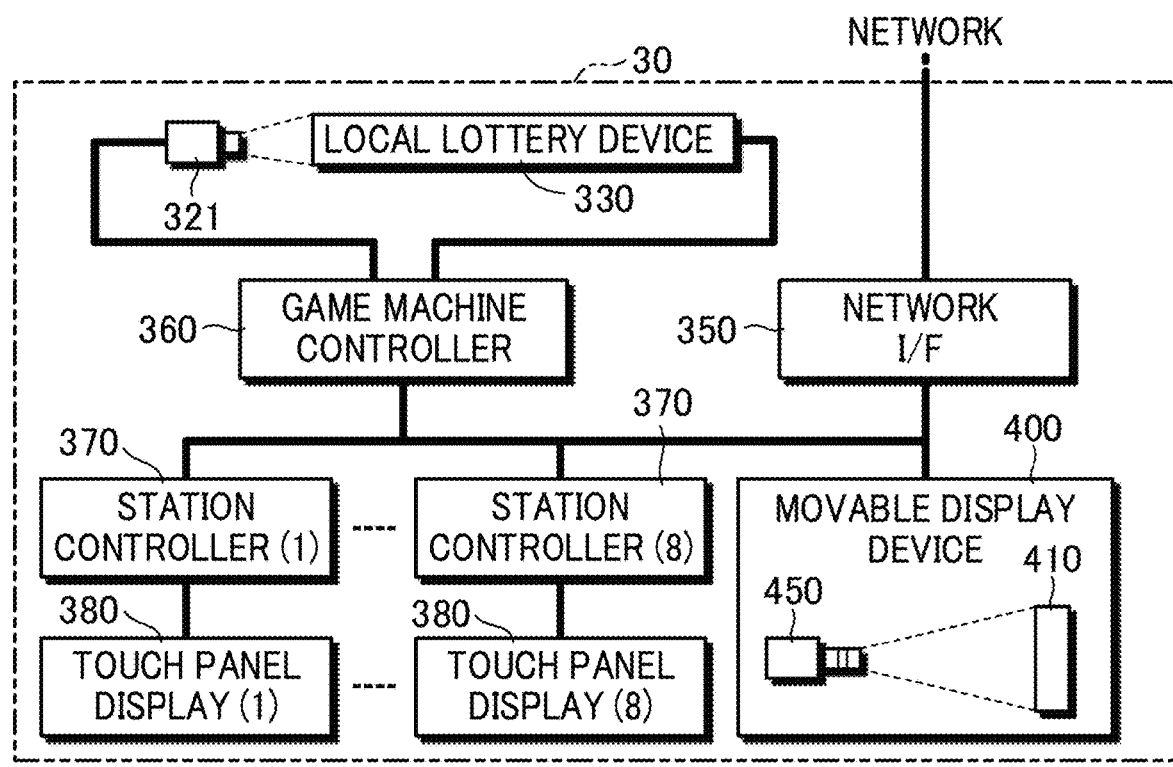
FIG. 4 is a block diagram showing a configuration of a game apparatus in the game system.

FIG. 4 is a block diagram showing a configuration of one game apparatus 30.

The game apparatus 30 in the figure is an example that has eight stations, and one station includes a station controller 370 and a touch panel display 380. The game apparatus 30 includes, in addition to the eight stations, a camera 321, a local lottery device 330, a network I/F 350, a game machine controller 360, and a movable display device 400. The movable display device 400 includes a display surface 410 and a projector 450.

In the figure, numbers in parentheses (1) to (8) are assigned to the station controllers 370 and the touch panel displays 380 in the eight stations, to facilitate distinguishing of correspondences therebetween.

The local lottery device 330 is a device that has a physical lottery mechanism, and is, for example, a device that has a roulette-type lottery mechanism. Details of the local lottery device 330 will be described later. The camera 321 captures a lottery situation of the local lottery device 330. The game machine controller 360 controls the camera 321, the local lottery device 330, the movable display device 400, etc., and also manages the eight stations.

The touch panel display 380 includes a touch panel that receives a touch operation performed by a finger of the player or the like, and a flat display that displays an image and that is combined with the touch panel. A station controller 370 corresponding to the touch panel display 380, under the management by the game machine controller 360, receives content of the touch operation to the touch panel display 380 and also controls content of display for the touch panel display 380.

In the movable display device 400, the projector 450 projects onto the display surface 410 a moving image output from the game machine controller 360. The movable display device 400, as will be described in detail later, is configured such that the display surface 410 thereof is divided into a plurality of blocks, and at least one or all of the plurality of blocks move in accordance with control of the game machine controller 360.

Alternative to the configuration for displaying the moving image from the projector 450 on the dividable display surface 410, the movable display device 400 may be configured such that respective ones of the plurality of blocks are flat displays, such as liquid crystal panels, and that the plurality of flat displays are movable independently of each other.

Figure 5:
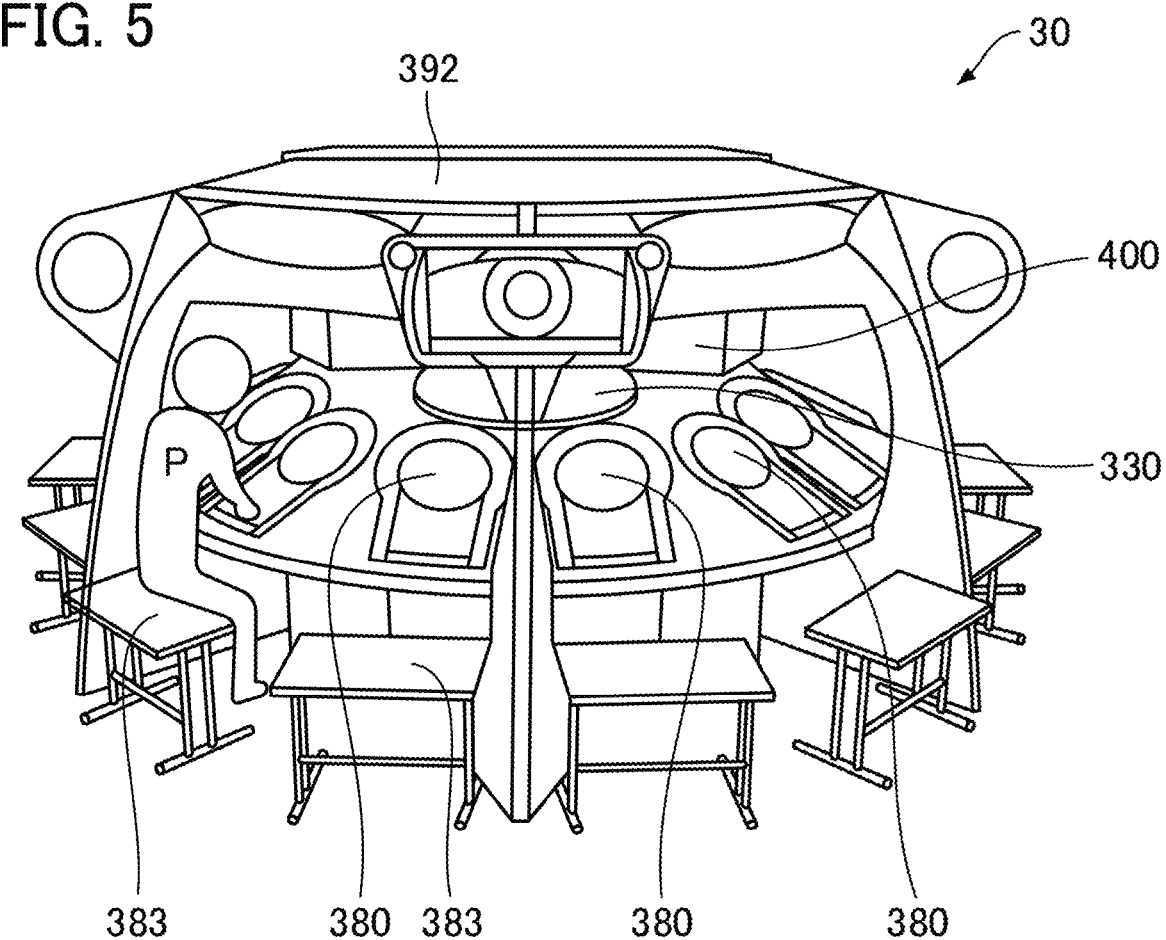
FIG. 5 is a perspective diagram showing an overall configuration of the game apparatus.
Figure 7:
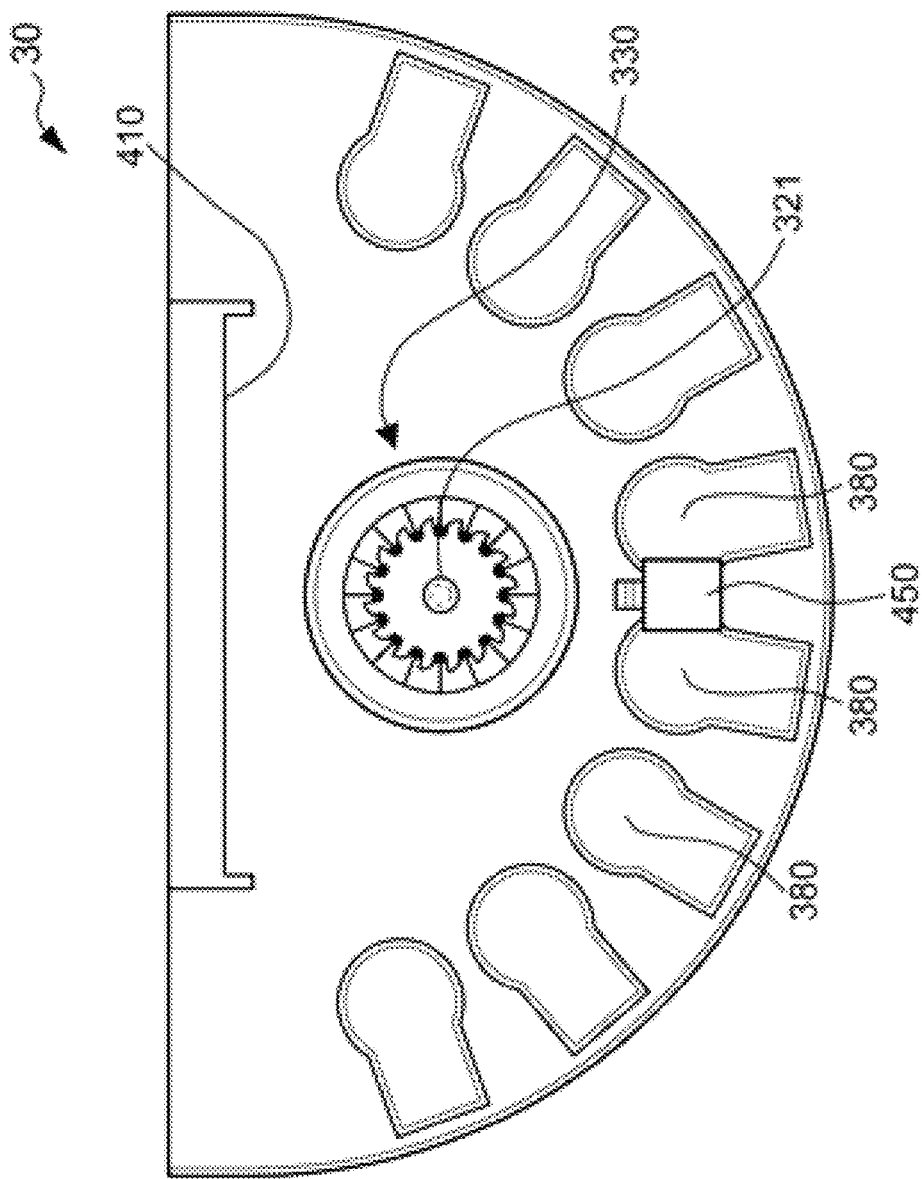
FIG. 7 is a diagram for explaining a planar configuration of the game apparatus.

FIG. 5 is a perspective diagram showing an overall configuration of the game apparatus 30, and FIG. 7 is a diagram in which the game apparatus 30 is seen in a planar view from a ceiling direction. While hidden and not shown in FIG. 5, the projector 450 and the camera 321 are mounted to a ceiling 392 of the game apparatus 30. The projector 450 projects a moving image on the display surface 410. The camera 321 captures the local lottery device 330 from the ceiling direction. The eight touch panel displays 380 are arranged radially, with the display surface 410 and the local lottery device 330 as an approximate center when seen in a planar view. A player P operates the touch panel display 380 while sitting on a chair 383 in FIG. 5.

Thus, the player P, while operating the touch panel display 380, can see the local lottery device 330 and the display surface 410 that are beyond the touch panel display 380.

Figure 6:
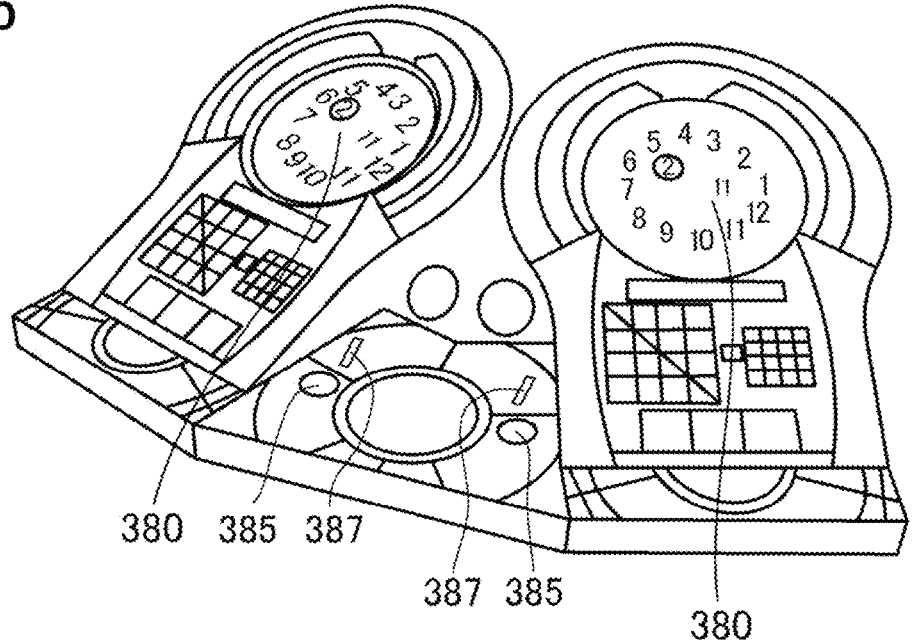
FIG. 6 is a diagram showing a configuration of a touch panel display in the game apparatus.

FIG. 6 is a diagram showing two touch panel displays 380 that are partially extracted from FIG. 5. An operation surface (display surface) of the touch panel display 380 has a shape in which a circle on a depth side as seen by the player P and a rectangle on a closer side as seen by the player P are interconnected.

For example, as shown in FIG. 6, in a circular portion, numerals, etc., are superimposed on a moving image showing a roulette wheel surface, while in a rectangular portion, results of a bingo game using the roulette, etc., are displayed.

As will be described in detail later, the moving image showing the roulette wheel surface is captured by the camera 321, etc., and the numerals, etc., superimposed thereon can be set by the player as appropriate.

In the vicinity of the touch panel display 380, a card reader 385 that reads data of a card and an insertion slot 387 for inserting game media are provided. Information on the player P is written in the card, and the data in the card is read by the card reader 385. Examples of the information on the player P include identification information of the player, information on credit indicative of a currency that can be used in the game, and/or play history of the game. There is no need to store all information on the player P on the card. Information on the player P may be stored additionally in a device capable of communicating with the game apparatus 30 (e.g., a server apparatus disposed in the same local network as the game apparatus 30, a server apparatus connected to the game apparatus via the Internet, etc.). For example, the information on credit and/or the information on play history may be stored in a dedicated server apparatus in association with the identification information on the player. The game media to be inserted into the insertion slot 387 may be money (bill or coin) or may be token coins, redemption tickets, or the like. Credit of an amount that corresponds to the game media inserted into the insertion slot 387 is stored in the game apparatus 30. The player P, by holding the card over the card reader 385 or inserting the game media into the insertion slot 387, causes the game apparatus 30 to store the information on credit, and by using a required number of credits, can participate in the game.

Figure 8:
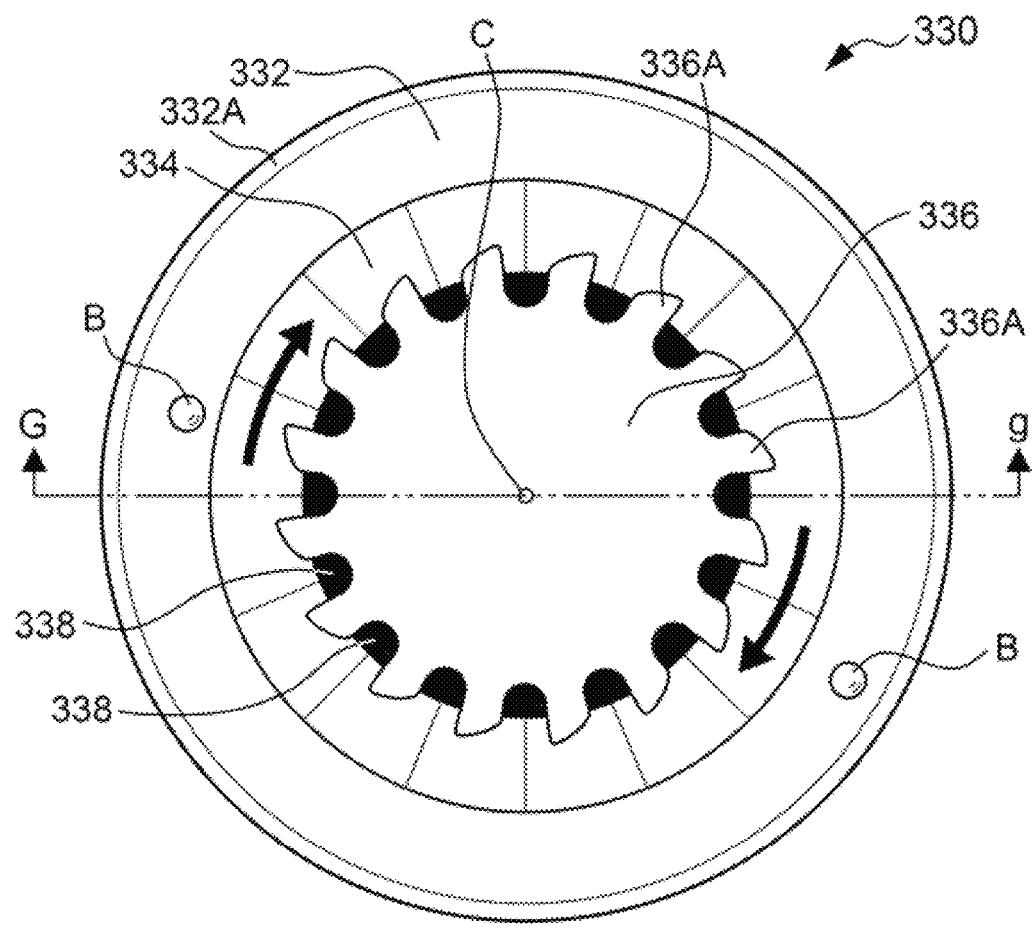
FIG. 8 is a plane view showing a configuration of a local lottery device in the game apparatus.
Figure 9:
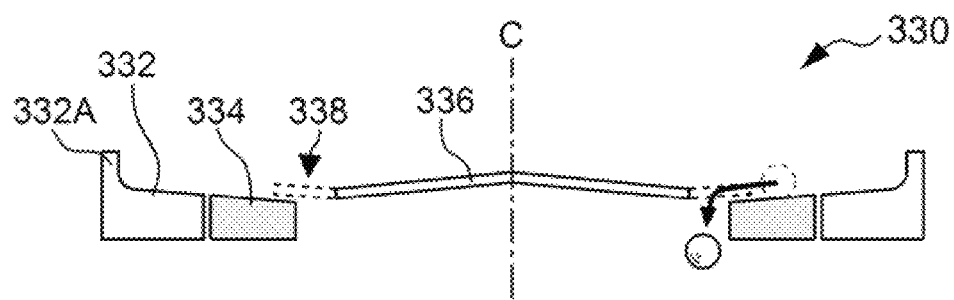
FIG. 9 is a diagram showing a configuration of the local lottery device.

FIG. 8 is a diagram showing a configuration of the local lottery device 330 when seen in a planar view, and FIG. 9 is a sectional view of a main part of the local lottery device 330 that is cut along Line G-g in FIG. 8.

As shown in these figures, one ball, or two or more balls B for lottery is able to spin in the local lottery device 330. When seen in a planar view, the local lottery device 330 includes a field 332 having a ring shape, and a rotary board 334 provided on an inner side of the field 332 and rotatable around a shaft C. The local lottery device 330 further includes a fixed pocket wheel 336 that includes a plurality of partitioning parts 336A partitioning a space on the rotary board 334 so as to form pockets 338 on the space. The fixed pocket wheel 336 is provided in such a manner that it does not interfere with the rotation of the rotary board 334. Tip end portions of the partitioning parts 336A, when seen in a planar view, extend over an inner peripheral edge of the rotary board 334 and protrude in a direction of an outer peripheral edge of the rotary board 334 to overlap the rotary board 334. Thus, base portions of the partitioning parts 336A function as the pockets 338 that guide the ball B towards cavities inside the rotary board 334. The figure shows an example in which the number of the pockets 338 is set to "16", where the pockets 338 are arranged at equal angles centered on the shaft C.

Each of the pockets 338 is provided with a sensor (not shown in the figure) such that the sensor detects falling of the ball B into the pocket 338, and that a result of the detection is supplied to the game machine controller 360. As shown in FIG. 9, upper surfaces of the field 332 and the rotary board 334 are sloped in a direction of gravity as the upper surfaces approach the shaft C while being substantially flush with each other. On an outer peripheral edge of the field 332, a wall part 332A that serves to prevent the ball B from falling off to the outside is formed.

The local lottery device 330 configured in this manner is controlled by the game machine controller 360. That is, the game machine controller 360 causes the rotary board 334 to rotate and feeds one ball, or two or more balls B along a peripheral edge of the field 332. The ball B that has been fed spins on the field 332 along the wall part 332A, but a spinning velocity thereof gradually decreases and the ball B eventually comes into contact with the rotary board 334. The ball B that contacts the rotary board 334 is again imparted with velocity by the rotary board 334 in rotation, and spins on the field 332.

The game machine controller 360, after feeding the ball B, gradually decreases a rotation speed of the rotary board 334. When the rotation speed of the rotary board 334 decreases to a certain point, even if the ball B contacts the rotary board, the velocity imparted to the ball B by rotation is small. Therefore, the ball B moves in a direction toward the shaft C and falls into one of the plurality of pockets 338.

When the ball B falls into one of the pockets 338, the sensor detects the fall and outputs the same to the game machine controller 360.

Accordingly, the game machine controller 360 is informed of which pocket the fed ball B has fallen into.

Such a lottery situation at the local lottery device 330, i.e., an operation from when one or more balls B are fed to when every ball B has fallen into the pockets 338, is captured by the camera 321, and a movement image of this operation is supplied to the game machine controller 360.

In some cases, the movement image alone may not be sufficient to determine which pocket 338 the ball B has fallen into. The game machine controller 360 uses the above-described result of the detection of the sensor for that reason.

The above is a description of the local lottery device 330 in the game apparatus 30. Next, the common lottery devices 231 to 233 in the common lottery game data center 20 will be described.

Figure 10:
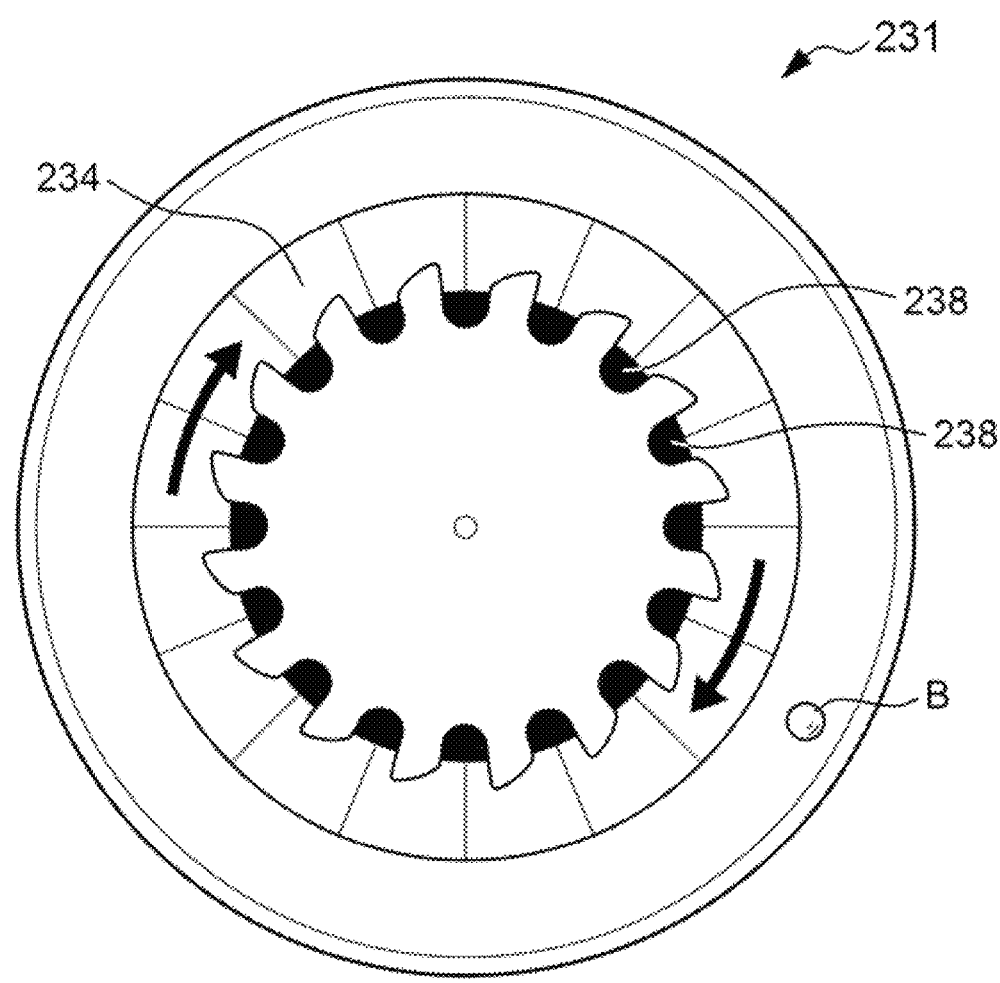
FIG. 10 is a diagram showing a configuration of a common lottery device (1) of the common lottery game data center.

FIG. 10 is a diagram showing a configuration of the common lottery device 231 when seen in a planar view. The common lottery device 231 is substantially the same as the local lottery device 330 in the game apparatus 30 in that there are provided a rotary board 234 and 16 pockets 238 into which a ball B for lottery that has been fed falls, and also in that the pockets 238 are provided radially.

Figure 11:
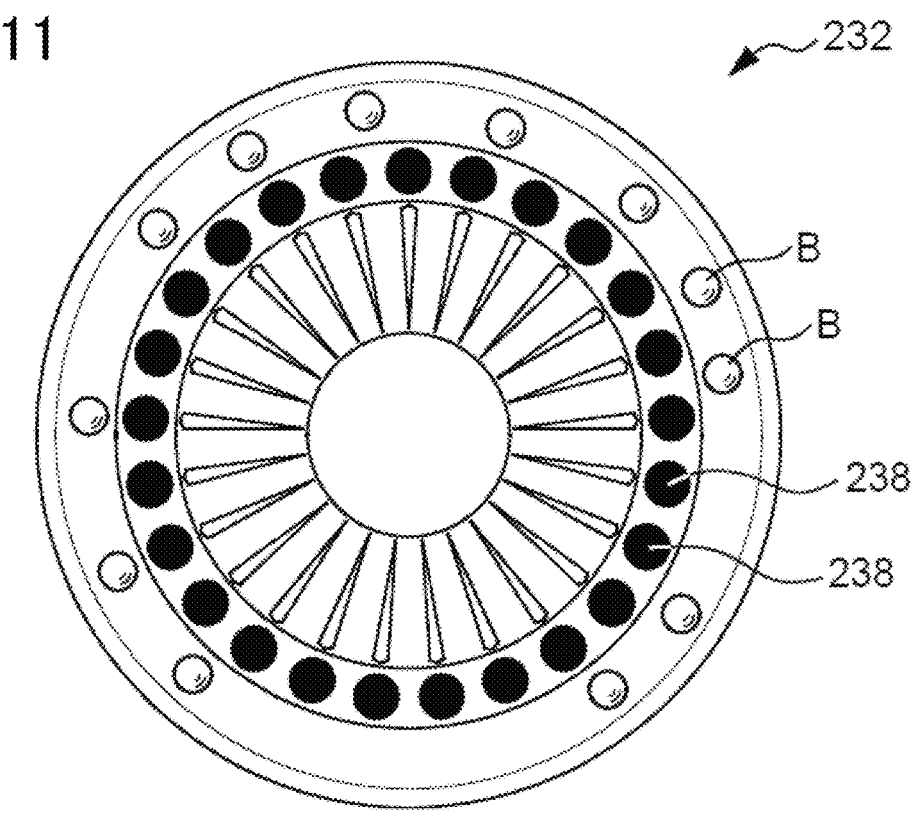
FIG. 11 is a diagram showing a configuration of a common lottery device (2) of the common lottery game data center.

FIG. 11 is a diagram showing a configuration of the common lottery device 232 when seen in a planar view. Unlike the common lottery device 231, in the common lottery device 232, 25 pockets 238 into which a ball B for lottery that has been fed falls are provided radially.

Figure 12:
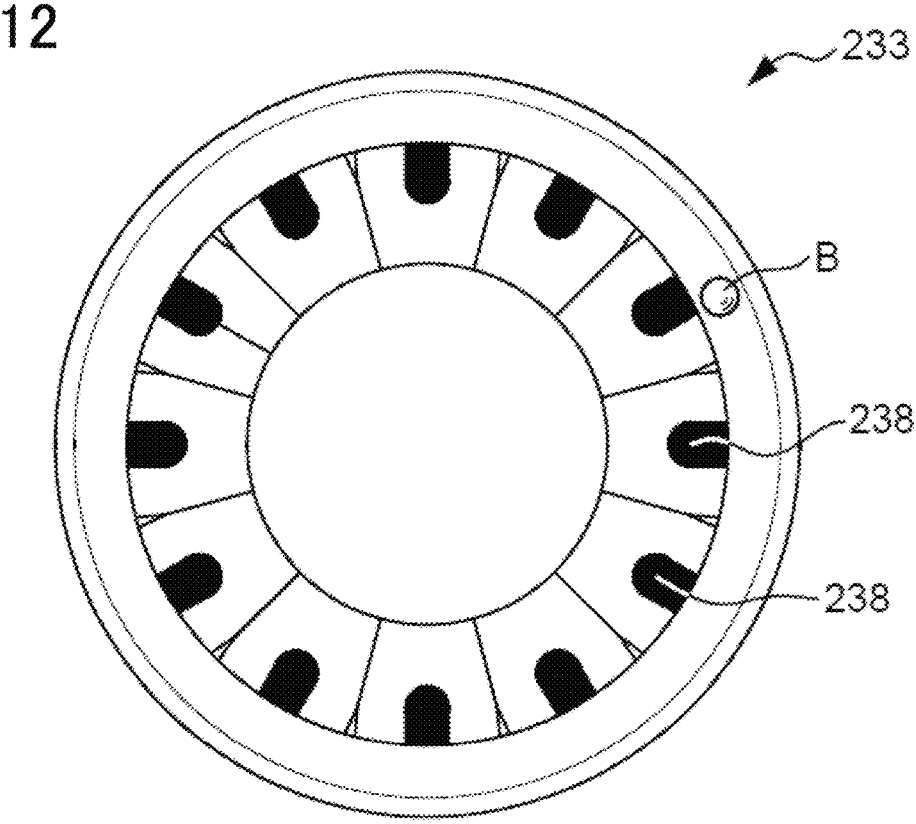
FIG. 12 is a diagram showing a configuration of a common lottery device (3) of the common lottery game data center.

FIG. 12 is a diagram showing a configuration of the common lottery device 233 when seen in a planar view. Unlike either of the common lottery device 231 or 232, in the common lottery device 233, 12 pockets 238 into which a ball B for lottery that has been fed falls are provided radially.

A lottery situation at the common lottery device 231, i.e., a lottery situation from when one or more balls B are fed to when every ball B has fallen into the pockets 238, is captured by the camera 221 and the movement image of the lottery situation is supplied to the common lottery device controller 244.

Similarly, a lottery situation of the common lottery device 232 is captured by the camera 222 and a lottery situation of the common lottery device 233 is captured by the camera 223, and movement images of the lottery situations captured by the cameras 222 and 223, respectively, are supplied to the common lottery device controller 244.

The common lottery devices 231 to 233 are mere examples, and they may of course have different configurations than those shown in the figures. For example, the common lottery device 231 may have a different configuration than that of the local lottery device 330. The number of pockets 238 may be other than the example shown in the figure. Moreover, a configuration other than a roulette-type may be adopted. For example, there may be employed a lottery device in which a disc is rotated and a lottery result is output in accordance with a position at which the disc halts, or a lottery device in which a die on which surfaces are assigned numerals or the like is thrown and a lottery result is output in accordance with a numeral or the like that is on the top surface of the die when the die has come to rest.

Figure 13:
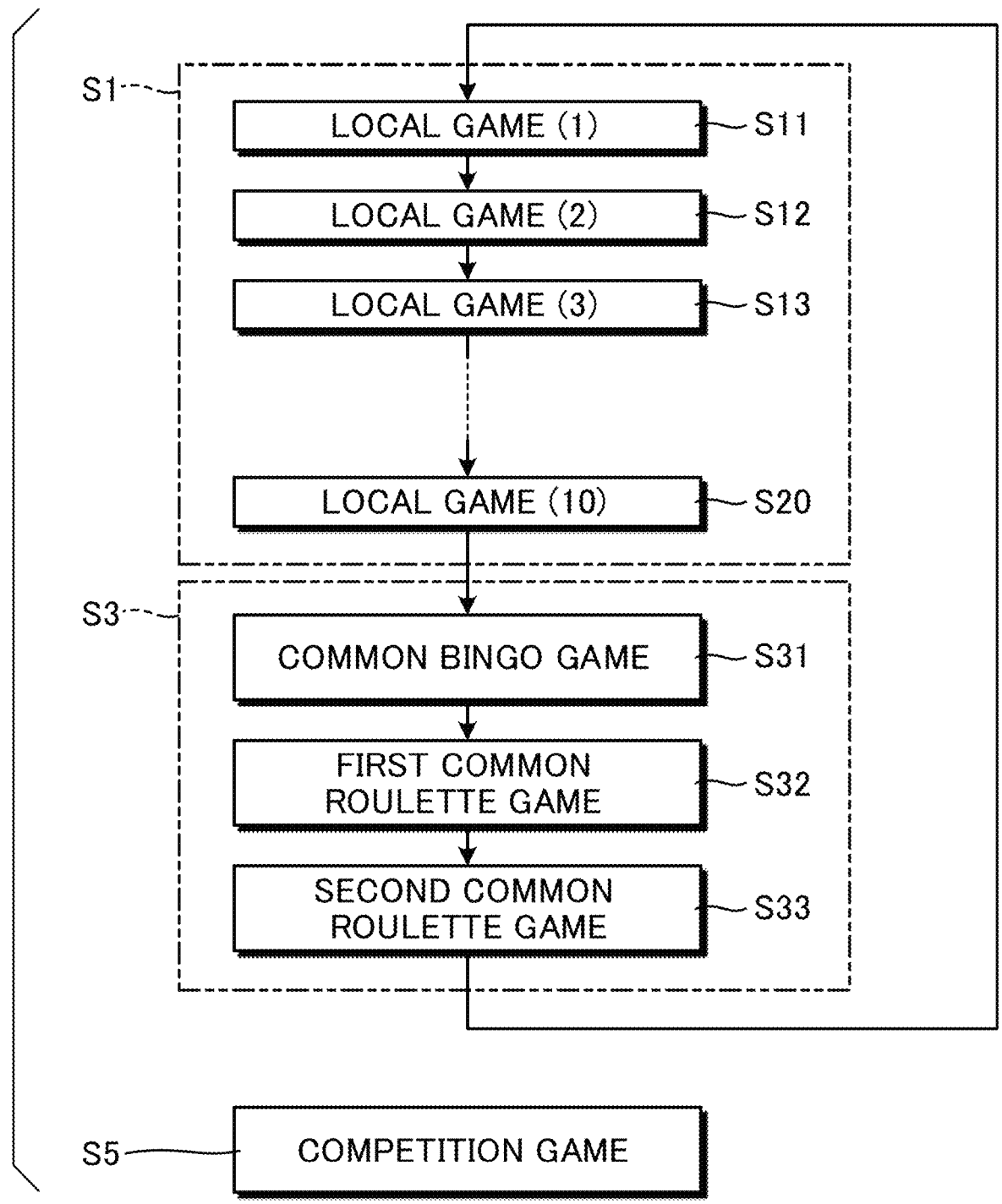
FIG. 13 is a flow diagram showing a flow of a game in the game system.

FIG. 13 is a diagram showing an overall flow of a game executed in the game system 1.

As shown in the figure, in the game system 1, a cycle is repeated in which, after an individual game S1 is executed in each of the plurality of game apparatuses 30, a common game S3 is executed. In the common game S3, results of the game are related to each other among all or some of the plurality of game apparatuses 30. A competition game S5 performed among the game apparatuses 30 is also an example of a common game. The competition game S5 is executed when a predetermined condition is satisfied in the individual game S1. Progresses of the individual game S1, the common game S3, and the competition game S5, which is performed among the game apparatuses 30, are controlled by, for example, the common game controller 110 in the common game server 10.

In the present example, the individual game S1 is a game that is executed individually at each of the plurality of game apparatuses 30 using the local lottery device 330 of each game apparatus, and in the present example, the individual game S1 consists of local games repeated ten times (S11 to S20). In the figure, numbers in parentheses (1) to (10) are assigned to the respective ten local games to facilitate distinguishing therebetween.

The common game S3 is a game that is executed using the common lottery devices 231 to 233 such that results of the game are related to each other among all or some of the plurality of game apparatuses 30. In the present example, the common game S3 consists of three games performed in a row; a common bingo game S31, a first common roulette game S32, and then a second common roulette game S33.

In any one local game among the local games S11 to S20 in the individual game S1, eight balls B are fed in the local lottery device 330, and payouts are paid (i.e., credit is granted) to players in accordance with results that depend on positions of the pockets 338 into which the eight balls B have fallen.

In the present example, in one local game, as will be further described later, a player can participate in three kinds of games from "No. 1" to "No. 3" at the same time. In order for a player to participate in any one of the three kinds of games, for example, use of five credits is a condition.

All of the three kinds of local games use a lottery result of the local lottery device 330. A common operation in one local game will be described first, and then individual characteristics of the three kinds of games will be described.

Figure 14:
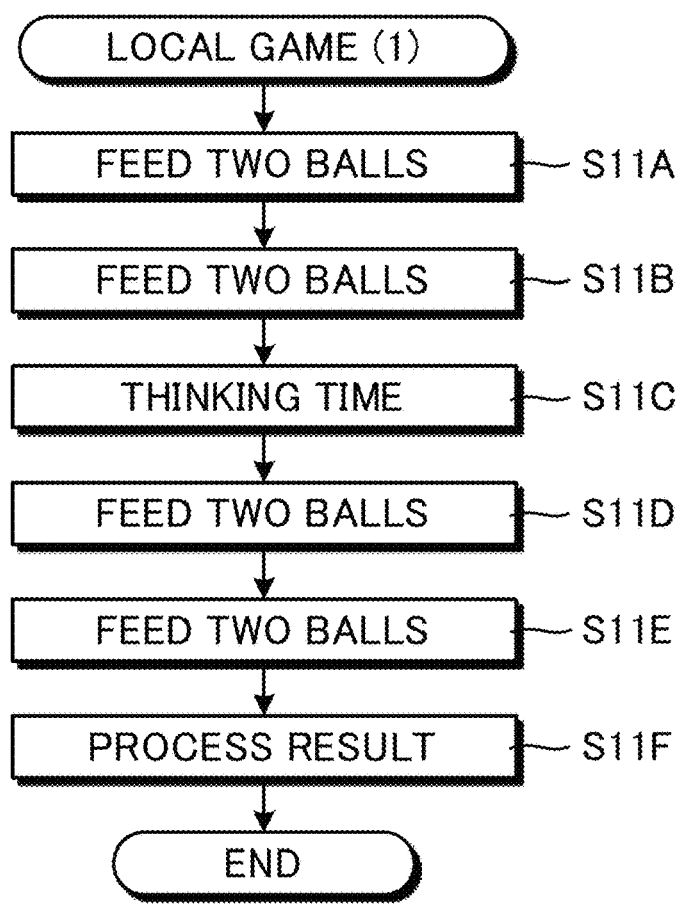
FIG. 14 is a flow diagram showing a flow of a local game executed at the game apparatus.

FIG. 14 is a diagram showing a flow of a local game.

Since the flows of the local games S11 to S20 are identical, the local game S11 will be described here as a representative.

As shown in FIG. 14, in step S11A, the game machine controller 360 feeds two balls into the local lottery device 330. The two balls B eventually fall into some of the pockets 338. Thereafter, in step SUB, the game machine controller 360 feeds two balls B again. The two balls B fall into some of the pockets 338. At this point in time, positions of the pockets 338 into which a total of four balls B have fallen are determined.

Prior to step S11A, the game machine controller 360 provides a period (bet time) in which a bet operation and an operation for setting content of a lottery condition (described later in detail) is permitted, and moreover, in step S11C gives a player a consideration time (thinking time) in which an operation for additionally setting a lottery condition is permitted. As the thinking time in step S11C, 60 seconds are given, for example. During the thinking time, the player, taking account of the positions of the pockets 338 into which the four balls B have fallen, inputs content of the lottery condition by operating the touch panel display 380.

When the thinking time is over, in step S11D, the game machine controller 360 causes the local lottery device 330 to feed two balls B, and after allowing the two balls B to fall into some of the pockets 338, in step S11E, the game machine controller 360 feeds two balls B again, and allows the two balls B to fall into some of the pockets 338. At this point in time, positions of the pockets 338 into which a total of eight balls B have fallen are determined.

The game machine controller 360, in step S11F, acquires a game result of each player from each station controller 370. Here, the station controller 370 generates a game result in accordance with the positions of the pockets 338 into which the eight balls B have fallen, content of the bet, and content of the lottery condition. Examples of the game result include, for example, information on the number of credits to be paid as payouts, information on a kind and the number of items to be granted as rewards, etc. Reception of a bet operation, management of bet information, granting of a reward in accordance with game results and the bet, and the like are mainly executed by the station controller 370; however, at least one or all of the processes may be executed by the game machine controller 360 or may be executed by the station controller 370 and the game machine controller 360 working in coordination with each other.

Figure 15:
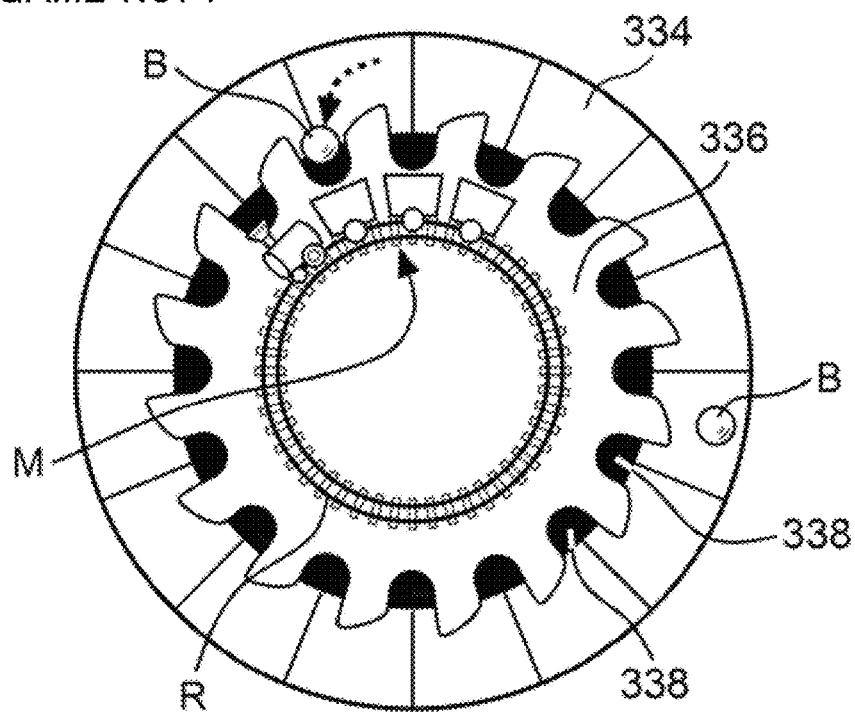
FIG. 15 is a diagram showing an example of a local game (1).

FIG. 15 is a diagram showing game content of a "local game No. 1" (first kind) from among the three kinds of games in the local game, and shows a screen displayed on the touch panel display 380. In this screen, the ball B, the rotary board 334, the pocket wheel 336, and the 16 pockets 338 are based on the movement image of the local lottery device 330 captured by the camera 321. The movement image is transmitted to the station controller 370 via the game machine controller 360.

The station controller 370 generates an image of a circular railroad R and a freight train M that runs circularly on the railroad R, and causes the touch panel display 380 to display the image in superimposition with the movement image transmitted via the game machine controller 360.

An example of the image resulting from such superimposition is shown in FIG. 15.

The freight train M displayed on the touch panel display 380 has such a formation that a locomotive pulls one, or two or more freight cars. Game content of the "local game No. 1" is such that a payout is paid to a player when the pocket 338 into which the ball B falls and a position of a running freight car coincide with each other at the right timing, i.e., when it looks as if the ball B entered any of the freight cars.

The number of freight cars can be changed, as appropriate, by the player operating the touch panel display 380 during the bet time and the thinking time. If the player changes the number of freight cars, a payout to be granted when the ball B enters a freight car also changes. Specifically, when the number of freight cars is smaller, a probability of the ball B entering any of the freight cars (prize winning rate) is lower, and thus, the payout is higher. In contrast, when the number of freight cars is greater, the prize winning rate is higher, and thus, the payout is lower. As described above, by changing the number of freight cars, the player can make a low-risk low-return bet or a high-risk high-return bet. Information on a payout may be displayed in association with the image of the freight train M; for example, payout information is superimposed on each freight car and is thus displayed. The payout information may differ for each freight car, and some of the freight cars may be associated with an item, apart from a payout.

While the "local game No. 1" is executed at eight stations in a single game apparatus 30, the number of freight cars may be changed for each player (each station). Accordingly, for each of the players that are playing at the eight stations, a prize winning rate and a payout may be set in accordance with an intention of the player.

The number of freight cars as referred to herein is an example of an attribute set by an operation input of a player. The attribute will be described later. Whether a pocket will be valid when a ball B falls into a pocket is based on a position of the freight train M. How much payout or what kind of item will be obtained, or whether both of the payout and item will be obtained, are also based on a position of the freight train M. Thus, it can be said that an attribute of a pocket changes with time. The station controller 370 generates a game result for a player based on the attribute of the pocket that changes with time and on the position of the pocket the ball B has entered.

At the plurality of game apparatuses 30, the "local game No. 1" may be executed at the same time. When such a local game is executed, the common game controller 110 in the common game server 10 can assign an item for a common game to the station of any one or more of the game apparatuses 30. At the station to which the item is assigned, a state in which the item is loaded on a freight car is displayed. It is of note that the common game server 10 may select any one or more of the game apparatuses 30, and the game machine controller 360 of the selected game apparatus 30 may select the station to which the item for the common game is assigned.

Examples of the item for the common game are not particularly shown in the figures but may include a participation item serving as a condition for participating in the common game, or a superior item that designates the subject game apparatus 30 to play a banker role (superior role) in the competition game among the game apparatuses 30, etc. When the ball B enters via a pocket 338 a freight car in which such an item has been loaded, the player obtains the item.

When the player obtains the item, at least information indicative of a type of item, information on the station at which the player is playing, and information on the game apparatus 30 that has the station are transmitted by the game machine controller 360 to the common game controller 110.

As a result, the common game controller 110 can be informed of the items obtained and the number of items obtained in the individual game S1, for each station of each game apparatus 30.

Figure 16:
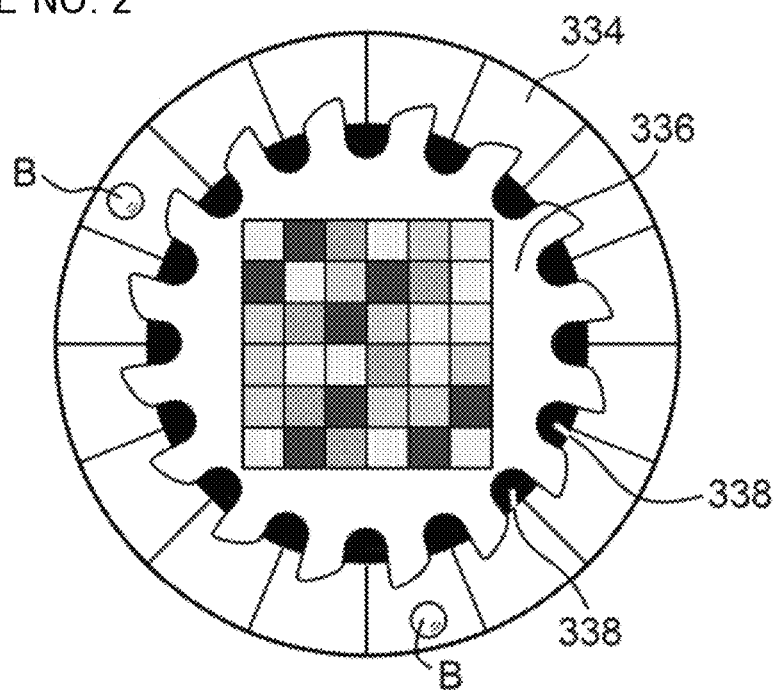
FIG. 16 is a diagram showing an example of a local game (2).

FIG. 16 is a diagram showing game content of a "local game No. 2" (second kind) from among the three kinds of games in the local game, and shows a screen displayed on the touch panel display 380. In this screen, the ball B, the rotary board 334, the pocket wheel 336, and the 16 pockets 338 are based on the movement image of the local lottery device 330, in substantially the same way as for the "local game No. 1". The movement image is transmitted to the station controller 370 via the game machine controller 360. The station controller 370 generates an image of, for example, blocks of five colors arranged in six rows and six columns approximately at a center of the pocket wheel 336, and causes the touch panel display 380 to display the image in superimposition with the movement image transmitted via the game machine controller 360. In the beginning of the game, the station controller 370 arranges the blocks such that in the arrangement of the blocks, three or more blocks of the same color are not adjacent to one another in an up-down direction or a left-right direction.

An example of the image resulting from such superimposition is shown in FIG. 16.

In the "local game No. 2", among the blocks arranged in six rows and six columns, blocks overlapping with a line L connecting the pockets 338 into which two balls B have fallen disappear, and the blocks located on an upper side of the line L fall. After the fall, when three or more blocks of the same color are aligned in the up-down direction or the left-right direction, these blocks disappear, and blocks on an upper side fall further.

Figure 17:
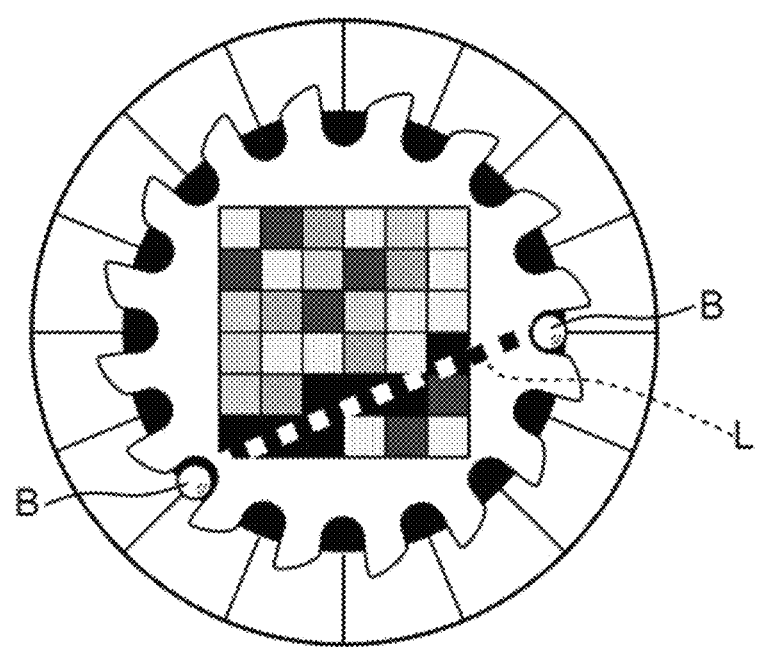
FIG. 17 is a diagram showing an example of the local game (2).

FIG. 17 is a diagram in which the blocks overlapping with the line L are shown in black and shows a state immediately before the blocks located further on the upper side than the line L fall. Such a fall is continued until three or more blocks of the same color are no longer adjacent to each other in the up-down direction or the left-right direction.

A greater number of blocks that have disappeared by a point in time at which a total of eight balls B have been fed means a higher payout, and a maximum payout is obtained when all of the 36 blocks have disappeared.

While the "local game No. 2" is executed at eight stations in one game apparatus 30, the arrangement of blocks of six rows and six columns may be either different for each of the eight stations or may be the same for all the stations.

The common game controller 110 in the common game server 10 may generate an item for the common game, such as that as described above. This item is generated for a certain block from among the 36 blocks, for a station of any one or more of the game apparatuses 30. Eliminating a block for which such an item is generated, the player obtains the item.

Figure 18:
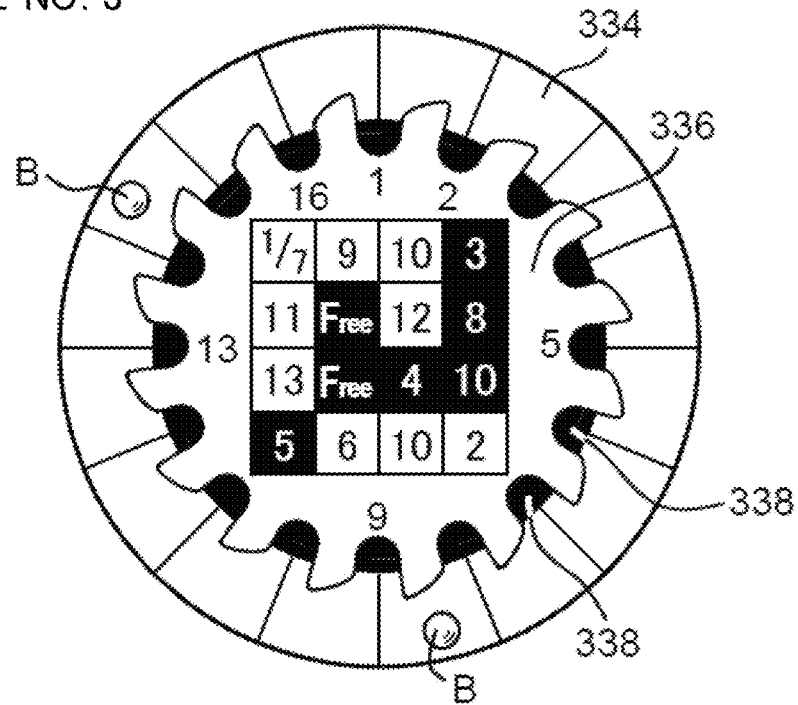
FIG. 18 is a diagram showing an example of a local game (3).

FIG. 18 is a diagram showing game content of a "local game No. 3" (third kind) from among the three kinds of games in the local game, and shows a screen displayed on the touch panel display 380. In this screen, the ball B, the rotary board 334, the pocket wheel 336, and the 16 pockets 338 are based on the movement image of the local lottery device 330, in substantially the same way as for the "local game No. 1" and the "local game No. 2".

The station controller 370 generates an image of a bingo card in which squares are arranged in four rows and four columns approximately at a center of the pocket wheel 336, and causes the touch panel display 380 to display the image in superimposition with the movement image transmitted via the game machine controller 360.

In the pockets 338 in the local lottery device 330, for example, numbers (attributes) from "1" to "16" are set in the figure in a sequence, clockwise starting from 12 o'clock. The number corresponding to the pocket into which the fed ball B falls will turn valid (Hit) in the bingo card. In the figure, the number of the square that has turned valid is displayed in white letters against a black background. In the figure, numbers set for the pockets 338 are omitted where appropriate.

In the figure, squares designated as "Free" space are already valid when the ball B is fed. As an example of setting a lottery condition, the numbers (attributes) set for the pockets can be changed, as appropriate, by a player operating the touch panel display 380 during the bet time and the thinking time.

In the bingo card generated, although not particularly shown in the figure, an item that generates a predetermined game effect in the bingo game is assigned in some cases. As an example of setting a lottery condition, this item can be disposed in a freely selected square by the player operating the touch panel display 380 during the bet time and the thinking time. When the square in which the item is disposed turns valid as the ball B falls into a corresponding pocket, the item generates a game effect that the squares located adjacent above, adjacent below, adjacent left, and adjacent right to the square also turn valid.

A greater number of bingo lines completed by a point in time at which a total of eight balls B has been fed means a higher payout.

While the "local game No. 3" is executed at eight stations in one game apparatus 30, the arrangement pattern in the bingo card may be either different for each of the eight stations or the same for all the stations.

The common game controller 110 in the common game server 10 can generate an item for the common game, such as that described above, where the item is generated so as to be associated with a specific number in the bingo card, for a station of any one or more of the game apparatuses 30. When the number for which such an item is generated turns valid as a result of the falling of ball B, the player obtains the item.

In one local game, the local lottery device 330 is used to execute the three different "local game No. 1", the "local game No. 2", and the "local game No. 3" concurrently. The player selects one among the three kinds of games, as appropriate, and participates in the same.

Such a local game is executed ten times from S11 to S20 in each of the plurality of game apparatuses 30.

In ten local games, the touch panel display 380 operated by the player displays content for each player, and the display surface 410 of the movable display device 400 displays the lottery situation of the local lottery device 330, etc.

Next, the common game S3 will be described. The individual game S1 (the local games S11 to S20) is executed at the plurality of game apparatuses 30 using the corresponding local lottery devices 330 of the respective game apparatuses. The common game S3 is executed using the common lottery devices 231 to 233 in the common lottery game data center 20 in turns.

We assume that a player who is allowed to participate in the common bingo game S31, which is executed first in the common game S3, is a player who has obtained seven or more participation items in the individual game S1 described above, for example. As described above, the common game controller 110 is informed of the number of participation items obtained for each station of each game apparatus 30. Therefore, after termination of the individual game S1, the common game controller 110 identifies a station that has obtained seven or more participation items, and permits the station controller 370 of the identified station to play the common bingo game S31. Information indicative of the permission is transmitted from the common game controller 110 to the station controller 370 via the game machine controller 360 of the game apparatus 30.

In the common bingo game S31, the movement image of the common lottery device 231 is used. The common game controller 110 checks on an acquisition status (download status) of movement images of the common lottery device 231 that are stored in the moving image database 246, with respect to one or more of the game apparatuses 30 related to the common bingo game S31, i.e., one or more of the game apparatuses 30 at which the common bingo game S31 will be performed. Then, based on the acquisition status of movement images of the common lottery device 231, the common game controller 110 identifies a movement image to be displayed in the common bingo game S31, and transmits information designating the identified movement image to the game apparatus 30 related to the common bingo game S31. At the game apparatus 30, the movement image designated by the common game controller 110 is displayed on the display surface of the movable display device 400, and operation history information related to the movement image is used to cause the game to progress. The operation history information is stored in the moving image database 246 in association with each movement image, and the game apparatus 30 acquires (downloads) the operation history information together with each movement image in advance. The operation history information is information indicative of a timing at which the ball B was fed, a position of the pocket 238 into which the ball B entered, a timing at which the ball B entered, etc., in the movement image. The game apparatus 30, by using the operation history information, can progress the game in conformity with the movement image. For example, by using the information on the timing at which the ball B was fed in the movement image, a countdown display, etc., can be performed in conformity with the movement image. It is of note that the game apparatus 30 may analyze a timing at which the ball B was fed, a position of the pocket 238 that a ball B entered, etc., based on the movement image; however, by using the operation history information, a processing load at the game apparatus 30 can be reduced.

Figure 19:
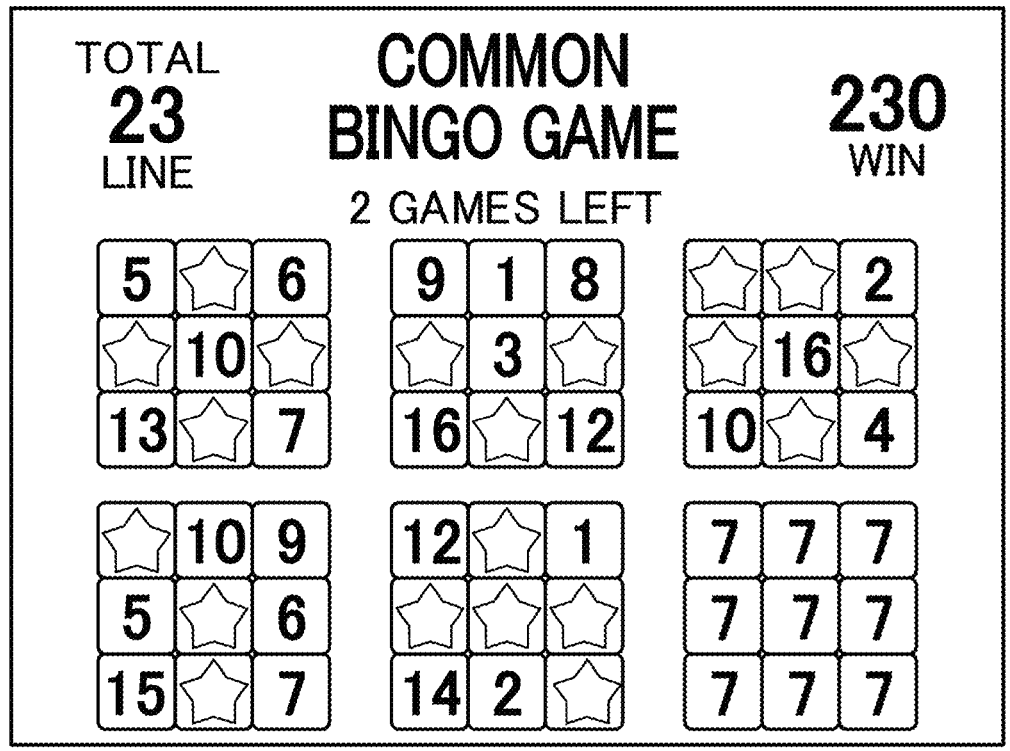
FIG. 19 is a diagram showing an example of a common bingo game.

The station controller 370 of a station that is permitted to participate in the common bingo game S31 generates and displays a screen shown in FIG. 19 on the touch panel display 380.

In the common bingo game S31, as shown in the figure, from among the squares of the six bingo cards generated, the number corresponding to a pocket into which the ball B that has been fed at the common lottery device 231 falls turns valid in the bingo cards.

The game machine controller 360 acquires information on a station participating in the bingo game (e.g., a station ID, information on the number of bingo lines, etc.) from the station controller 370, and transmits the acquired information to the common game controller 110 together with the information on the game apparatus 30. Thus, the common game controller 110 can be informed of the number of bingo lines for each player in the common bingo game S31 (for each station of the game apparatus 30 related to the common bingo game S31).

In the common bingo game S31, a player (a station of the game apparatus 30) that can participate in the next first common roulette game S32 is determined based on the number of bingo lines or the like in the bingo game. Specifically, the common game controller 110 determines, as players participating in the first common roulette game S32, for example, a total of 25 players that consist of top 20 players in the numbers of bingo lines and additional five players with predetermined ranking numbers among those who are ranked 21 or below (for example, players with ranking numbers 30, 40, 50, and 60 plus the player with the lowest ranking number).

In the common bingo game S31, when the ball B is fed to the common lottery device 231 (at the time of lottery), the display surface of the movable display device 400 transforms at the game apparatus 30 as will be described below, and the lottery situation at the common lottery device 231 is displayed three-dimensionally.

Moreover, in the common bingo game S31, the common lottery device controller 244 and the common game controller 110 may work in coordination with each other to feed a plurality of balls B to the common lottery device 231 at predetermined timings and distribute in real time a movement image, which shows a lottery situation of the common lottery device 231 that is captured by the camera 221, to the game apparatuses 30 related to the common bingo game S31. However, depending on a network state, etc., the movement image is distributed to the respective game apparatuses 30 at timings that do not coincide among the game apparatuses, and there are some cases in which the movement image cannot be displayed at the respective game apparatuses 30 at the same timing. Thus, acquiring movement images and the operation history information in advance at the respective game apparatuses 30 is more desirable.

In the first common roulette game S32, the movement image of the common lottery device 232 is used. The common game controller 110 checks on an acquisition status (download status) of movement images of the common lottery device 232 that are stored in the moving image database 246, for one or more of the game apparatuses 30 related to the first common roulette game S32, i.e., one or more of the game apparatuses 30 at which the first common roulette game S32 will be executed. Then, based on the acquisition status of movement images of the common lottery device 232, the common game controller 110 identifies a movement image to be displayed in the first common roulette game S32, and transmits information designating the identified movement image to the game apparatus 30 related to the first common roulette game S32. The common game controller 110 corresponds the 25 pockets in the common lottery device 232 with the decided 25 players (stations in the game apparatuses 30) on a one-to-one basis, and transmits information indicative of the correspondences to the game apparatuses 30 related to the first common roulette game S32.

Figure 20:
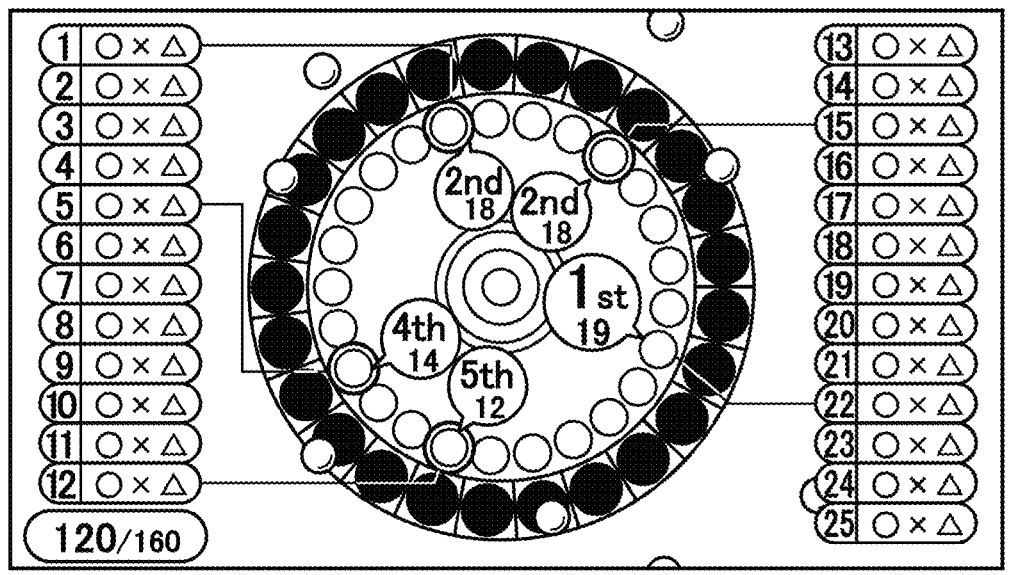
FIG. 20 is a diagram showing an example of a first common roulette game.

In the game apparatus 30, the game machine controller 360 uses the movement image of the common lottery device 232 designated by the common game controller 110, the operation history information related to the movement image, and the information indicative of the correspondences between the players and the pockets transmitted from the common game controller 110, to generate a screen such as that shown in FIG. 20, and causes each of the movable display device 400 and the touch panel display 380 to display the screen.

It is of note that the common game controller 110 may generate an image to be displayed in superimposition on the movement image, and transmit the generated image to the relevant game apparatuses 30.

In the first common roulette game S32, the common lottery device 232 continuously feeds, for example, 40 balls B. In the screen in FIG. 20, top five players for whom the numbers of balls that have fallen into the pockets 238 are large are displayed together with the ranking numbers and the numbers of balls, in speech balloons as a progress report. In the first common roulette game S32, players associated with pockets 238 into which two or more of the 40 balls B fed to the common lottery device 232 have fallen are winners, and these players are decided to be players to participate in the next second common roulette game S33. The players to participate can be decided as follows, for example. The common game controller 110, based on the operation history information on the common lottery device 232 and the information indicative of the correspondences of the players and the pockets 238, counts the number of balls B that have fallen into each pocket 238 for each player (each station of the game apparatus 30 related to the first common roulette game S32) who is associated with each pocket 238, and identifies players who are associated with pockets 238 for which the numbers of balls B that have fallen into are two or more.

In the first common roulette game S32, when the balls B are fed to the common lottery device 232 (at the time of lottery), the display surface 410 transforms in the game apparatus 30 as will be described below, and the lottery situation at the common lottery device 232 is displayed three-dimensionally. Moreover, in the first common roulette game S32, the common lottery device controller 244 and the common game controller 110 may work in coordination with each other to feed a plurality of balls B to the common lottery device 232 at predetermined timings and distribute in real time a movement image, which shows a lottery situation of the common lottery device 232 that is captured by the camera 222, to the game apparatuses 30 related to the first common roulette game S32. However, depending on a network state, etc., the movement image is distributed to the respective game apparatuses 30 at timings that do not coincide among the game apparatuses, and there are some cases in which the movement image cannot be displayed at the respective game apparatuses 30 at the same timing. Thus, acquiring movement images and the operation history information in advance at the respective game apparatuses 30 is more desirable.

In the next second common roulette game S33, a movement image of the common lottery device 233 is used. The common game controller 110 checks on an acquisition status (download status) of movement images of the common lottery device 233 that are stored in the moving image database 246, for one or more of the game apparatuses 30 related to the second common roulette game S33, i.e., one or more of the game apparatuses 30 at which the second common roulette game S33 will be executed. Then, based on the acquisition status of movement images of the common lottery device 233, the common game controller 110 identifies a movement image to be displayed in the second common roulette game S33, and transmits information designating the identified movement image to the game apparatus 30 related to the second common roulette game S33. The common game controller 110 corresponds the 12 pockets 238 in the common lottery device 233 and the players (stations in the game apparatuses 30) who have been determined to be players to participate in the second common roulette game S33, and transmits information indicative of correspondences of the associated pockets and players to the game apparatuses 30 related to the second common roulette game S33.

Figure 21:
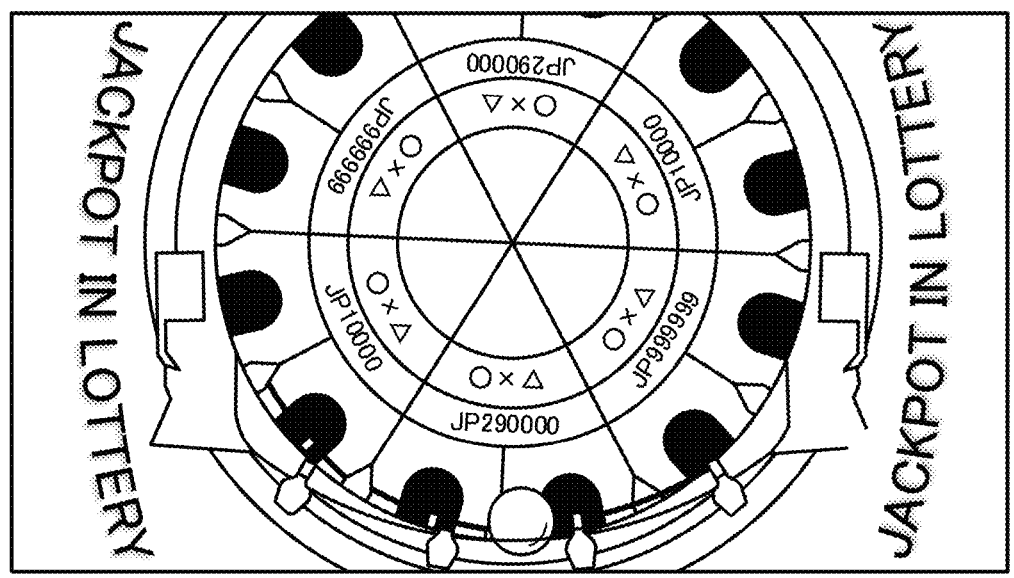
FIG. 21 is a diagram showing an example of a second common roulette game.
Figure 22:
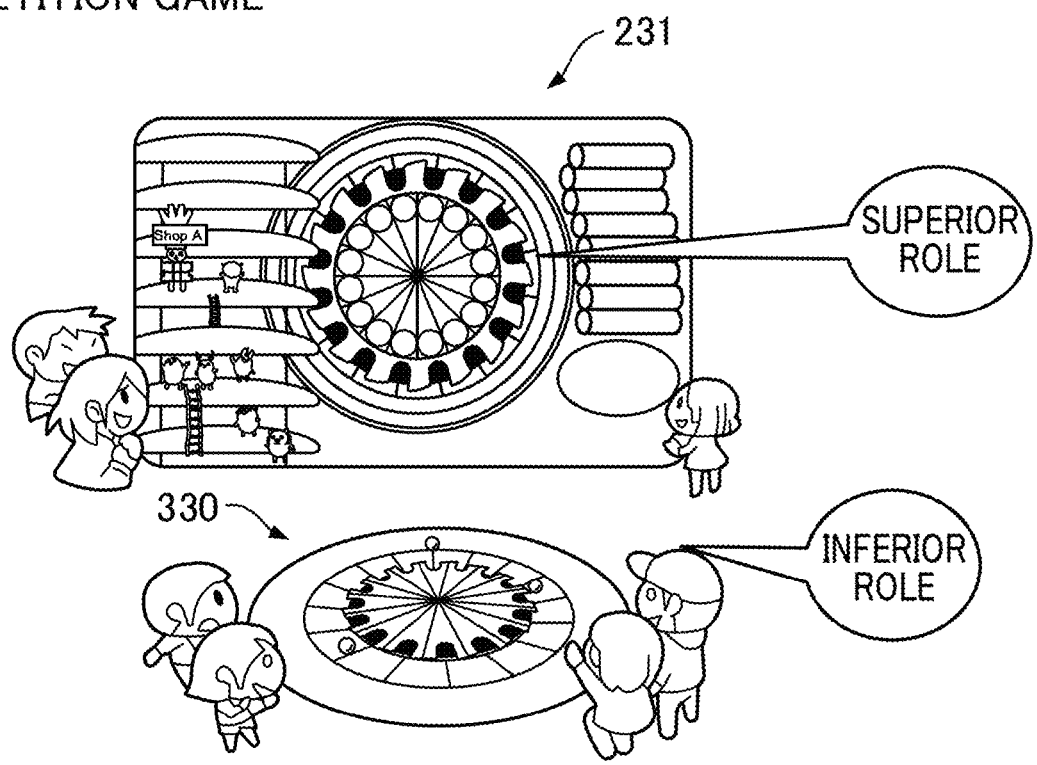
FIG. 22 is a diagram showing an example of a competition game.

In the game apparatus 30, the game machine controller 360 uses the movement image of the common lottery device 233 designated by the common game controller 110, the operation history information related to the movement image, and the information indicative of the correspondences between the players and the pockets 238, and that is transmitted from the common game controller 110, to generate a screen, such as that shown in FIG. 21, and causes each of the movable display device 400 and the touch panel display 380 to display the screen. It is of note that that the common game controller 110 may generate an image to be displayed in superimposition on the movement image, and transmit the generated image to the relevant game apparatuses 30.

In the second common roulette game S33, the common lottery device 233 feeds, for example, only one ball B. When the one ball B that has been fed falls into any of the pockets 238, a player corresponded with the pocket 238 is the winner and the player obtains a high payout (jackpot).

In the second common roulette game S33, when the ball B is fed to the common lottery device 233 (at the time of lottery), the display surface 410 transforms in the game apparatus 30 as will be described below, and the lottery situation at the common lottery device 233 is displayed three-dimensionally. Additionally, when a player wins a jackpot, the display surface 410 transforms into another form, and a display congratulating the player is performed.

Moreover, in the second common roulette game S33, the common lottery device controller 244 and the common game controller 110 may work in coordination with each other to feed the ball B to the common lottery device 233 at a predetermined timing and distribute in real time a movement image that indicates a lottery situation of the common lottery device 233 captured by the camera 223, to the game apparatuses 30 related to the second common roulette game S33. However, depending on a network state, etc., the movement image is distributed to the respective game apparatuses 30 at timings that do not coincide among the game apparatuses, and there are some cases in which the movement image cannot be displayed at the respective game apparatuses 30 at the same timing. Thus, acquiring movement images and the operation history information in advance at the respective game apparatuses 30 is more desirable.

When the second common roulette game S33 ends in the common game S3, again the local games S11 to S20 are executed in the individual game S1, and thereafter, the individual game S1 and the common game S3 are repeated alternately.

However, when a player (station) of any of the game apparatuses 30 obtains a superior item for a common game during a local game (S11 to S20) of the individual game S1, the competition game S5 among the game apparatuses 30 is executed in an interrupting manner after the termination of the local game or before the common game S3.

The competition game S5 among the game apparatuses 30 is a competition game in which the game apparatus 30 to which the player (station) who has obtained a superior item belongs plays the superior role (banker role) and other one or more game apparatuses 30 play the inferior roles (non-banker roles).

The competition between the superior role and the inferior role as referred to herein is, from the viewpoint of a game apparatus 30 playing an inferior role, a competition between the superior role and the subject game apparatus 30 (inferior role). From the viewpoint of the game apparatus 30 playing the superior role, the competition is between the subject game apparatus 30 (superior role) and, for example, one or more game apparatuses 30 that are freely selected as inferior roles by the common game controller 110 from among the plurality of game apparatuses 30 excluding the subject game apparatus 30.

The competition game S5 is a so-called tree climbing competition game, in which the one who reaches a higher point in the end is the winner. The tree climbing competition game progresses in accordance with a lottery result of the common lottery device 231 at the game apparatus 30 that plays the superior role, and at a game apparatus 30 that plays the inferior role, the game progresses in accordance with a lottery result of the local lottery device 330 of the same game apparatus 30. Lottery content executed for the superior role is displayed as a moving image also at the one or more game apparatuses 30 that play the inferior roles. Accordingly, the common game controller 110 checks on an acquisition status (download status) of movement images of the common lottery device 231, with respect to one or more of the game apparatuses 30 related to the competition game S5, the movement images being stored in the moving image database 246. Then, based on the acquisition status of movement images of the common lottery device 231, the common game controller 110 identifies a movement image to be displayed in the competition game S5, and transmits information designating the identified movement image to the game apparatus 30 related to the competition game S5. A configuration may be adopted in which, without using the movement image of the common lottery device 231, a movement image of the local lottery device 330 of the game apparatus 30 playing the superior role is distributed to the other game apparatuses 30 playing the inferior roles; however, in this configuration, a process for distributing a moving image is needed in the game apparatus 30 playing the superior role, and a process load of the game apparatus 30 playing the superior role will be high. Furthermore, there is a possibility that according to a network state, times at which the moving images are displayed do not coincide with each other among game apparatuses 30. In this regard, by using the movement image of the common lottery device 231, the problem mentioned above can be avoided.

Figure 23:
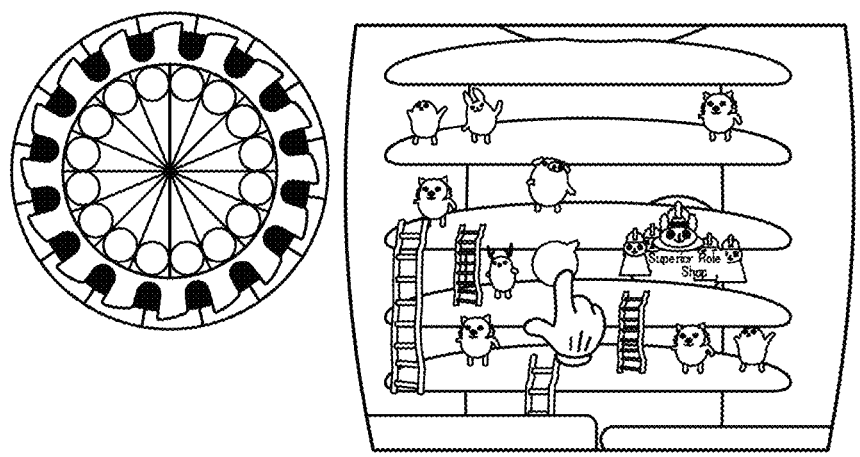
FIG. 23 is a diagram showing an example of the competition game.

FIG. 23 is a diagram showing game content of the competition game S5, and shows a part of the screen displayed on the touch panel display 380. As shown in this figure, one character corresponding to the superior role and a plurality of characters corresponding to respective ones of a plurality of players playing inferior roles are located on a stair-like tree.

Figure 24:
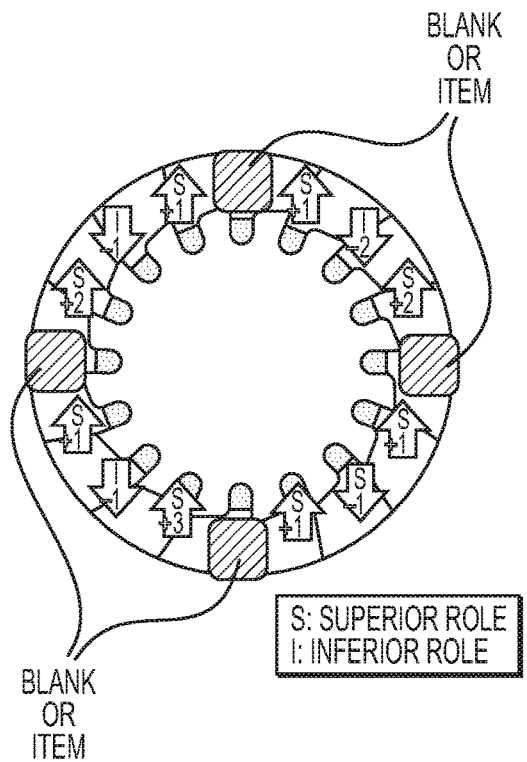
FIG. 24 is a diagram showing an example of a wheel grid of a superior role (banker role) in a competition game.

In the common lottery device 231, which executes a lottery for the superior role, an item that defines going up or down of the characters playing the superior role and the plurality of inferior roles is assigned to each of the pockets 238, as shown as an example in FIG. 24. When the ball B falls into any of the pockets 238, the character of the superior role or the inferior role goes up or down by steps corresponding to the item assigned to the pocket. A blank means to "stay".

Figure 25:
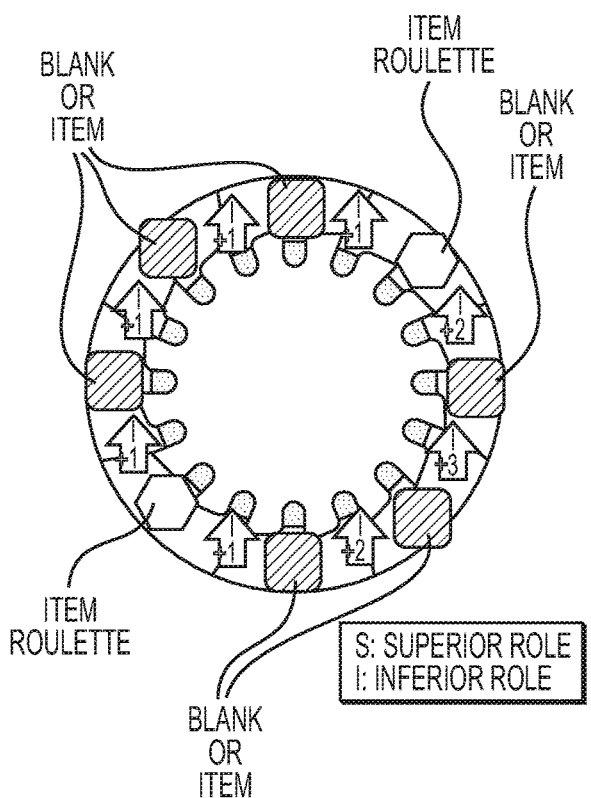
FIG. 25 is a diagram showing an example of a wheel grid of an inferior role (non-banker role) in the competition game.

Similarly, in the local lottery device 330, which executes a lottery for each inferior role, an item that defines going up or down of the character of the inferior role is assigned to each of the pockets 338, as shown in FIG. 25. When the ball B falls into any of the pockets 338, the character of the inferior role goes up or down by steps corresponding to the item assigned to the pocket 338.

Each of the game apparatuses 30 of the superior role and inferior roles generates a screen, such as that shown in FIG. 24, using the movement image of the common lottery device 231 designated by the common game server 10, the operation history information related to the movement image, and information on the items defining going up or down of characters, the items being assigned to the pockets 238 of the common lottery device 231, and causes the movable display device 400 to display the screen. The game apparatus 30 of each inferior role generates a screen, such as that shown in FIG. 25, using the movement image of the local lottery device 330, the position of the pocket 338 into which the ball B fell in the local lottery device 330, and information on items defining going up or down of the character of each inferior role, the items being set in the respective pockets 338 of the local lottery device 330, and displays the generated screen on the circular portion of the touch panel display 380. In the game apparatus 30 of each inferior role, the position of the character of each inferior role changes in accordance with a lottery result of the local lottery device 330, and information on the position is transmitted to the common game server 10. The common game server 10 receives from the game apparatus 30 of each inferior role position information of a corresponding character, and transmits position information of the characters of all of the inferior roles to the game apparatuses 30 playing the superior role and inferior roles. Each of the game apparatuses 30 playing the superior role and inferior roles generates a screen, such as that shown in FIG. 23, based on the position information of the character of the superior role determined based on the lottery result of the common lottery device 231, and the position information of the characters of all inferior roles received from the common game server 10, and displays the generated screen on the rectangular portion of the touch panel display 380.

In the procedure of a lottery, for example, after a cycle of "three shots for superior role→three shots for inferior role-→thinking time" is repeated three times, "three shots for superior role→three shots for inferior role" are performed, and then the procedure ends. In the end, if, for example, the character of an inferior role is located above the character of the superior role, the inferior role wins and obtains a payout. On the other hand, the superior role can obtain a higher payout as the character of the superior role is located higher than a greater number of characters of the inferior roles.

It is of note that a rule may be set in which during the thinking time, the superior role may obstruct going up of the characters of the inferior roles using a predetermined item, and the inferior roles may avoid the obstruction from the superior role.

Moreover, in the competition game S5, the common lottery device controller 244 and the common game controller 110 may work in coordination with each other to feed a plurality of balls B to the common lottery device 231 at predetermined timings and distribute in real time a movement image, which shows a lottery situation of the common lottery device 231 that is captured by the camera 222, to the game apparatuses 30 related to the competition game S5. However, depending on a network state, etc., the movement image is distributed to the respective game apparatuses 30 at timings that do not coincide among the game apparatuses, and there are some cases in which the movement image cannot be displayed at the respective game apparatuses 30 at the same timing. Thus, acquiring movement images and the operation history information in advance at the respective game apparatuses 30 is more desirable.

The above is the overall flow of the games executed in the game system 1.

Next, each of characteristic portions in such a game system 1 will be described individually. The game system of the present embodiment has the following three characteristic portions. The first characteristic is a configuration related to transformation of the display surface 410 in the movable display device 400; the second characteristic is a configuration related to moving image distribution control in the common game S3, etc.; and the third characteristic is a configuration related to attribute setting of each player on the game apparatus 30.

First, the configuration related to transformation of the display surface 410 in the movable display device 400, which is the first characteristic portion, will be described.

Figure 26:
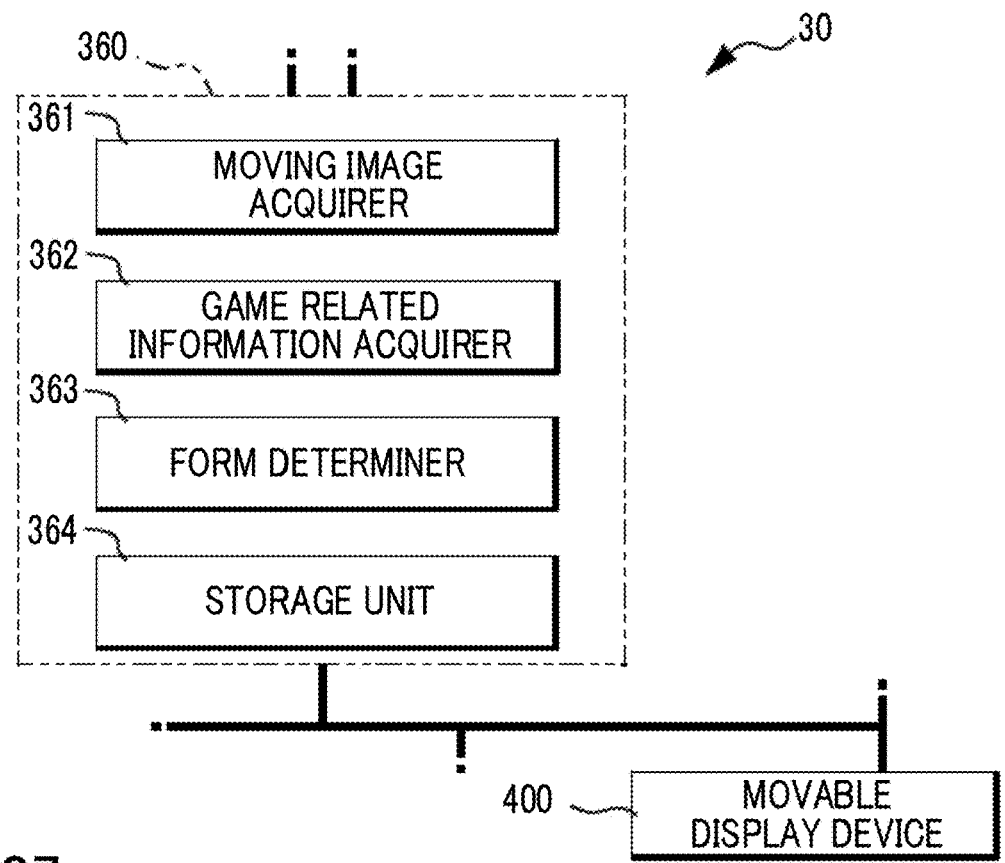
FIG. 26 is a diagram showing functional blocks of a configuration for transforming a display surface.

FIG. 26 is a block diagram showing functions configured by the game machine controller 360 of the game apparatus 30 in a case in which the game machine controller 360 controls the movable display device 400.

As shown in the figure, a moving image acquirer 361, a game related information acquirer 362, and a form determiner 363 and a storage unit 364 are configured by the game machine controller 360. That is, the moving image acquirer 361, the game related information acquirer 362, the form determiner 363, and the storage unit 364 are realized by the game machine controller 360 executing a computer program for transforming the display surface and functioning in accordance with the computer program.

The moving image acquirer 361 acquires a movement image to be displayed on the movable display device 400. For example, the moving image displayed on the movable display device 400 during lottery of the local games S11 to S20 in the individual game S1 is a movement image of the local lottery device 330. This movement image is a moving image including a period from when the ball B is fed to when the ball B falls into a pocket 338. If it is during the lottery of the local games S11 to S20 in the individual game S1, the moving image acquirer 361 acquires a movement image of the local lottery device 330 from the camera 321. In the meantime, the moving image acquirer 361 can in advance acquire movement images of the common lottery devices 231 to 233 from the moving image distributor 242 of the common lottery game data center 20 via the network N and store the movement images in the storage unit 364. If it is during the lottery of the common bingo game S31 in the common game S3, the game apparatus 30 displays the movement image of the common lottery device 231. If it is during the lottery of the first common roulette game S32, the game apparatus 30 displays the movement image of the common lottery device 232. If it is during the lottery of the second common roulette game S33, the game apparatus 30 displays the movement image of the common lottery device 233.

The game related information acquirer 362 acquires game related information.

In the present example, the game related information includes game information indicative of a type and a progress status of a game, and information on an operation result generation device. The information on an operation result generation device indicates a type and an operation state, etc., of a lottery device. The operation result generation device generates an operation result used in a game. In the present example, an operation result used in a game is a position of a pocket 238 or a pocket 338 into which the ball B has fallen, and the operation result is generated by one of the lottery devices.

The type of game in the game information indicates whether the game is the individual game S1 or the common game (including the common game S3 and the competition game S5) in the present example. For the common game, the type of game indicates whether the game is the common bingo game S31, the first common roulette game S32, the second common roulette game S33, or the competition game S5. The progress status of a game indicates in each game whether a current time point is before a lottery or during a lottery, whether it corresponds to a state in which a certain game result (winning of a jackpot) has been generated, whether a current time point is during a bet time, during a thinking time, etc. Such game information is, for example, generated by a process of the game machine controller 360 of each game apparatus 30, or acquired from the common game server 10 (common game controller 110).

The type of lottery device in the information on the operation result generation device indicates whether the lottery device is the common lottery device 231, 232, 233, or the local lottery device 330 in the present example. The operation state indicates, for example, whether a corresponding lottery device is in a state before feeding of the balls B or a state after the feeding, how many balls B have fallen into a pocket 238 or a pocket 338, whether it is a state in which the rotary board 234 or the rotary board 334 of a lottery device has started rotation, how many times the rotary board 234 or 334 has rotated, etc. The operation history information related to a movement image described above is also an example of the information on the operation result generation device, and the operation state of each lottery device can also be determined based on the operation history information.

The form determiner 363 identifies the type and the progress status of the game, the type and the operation state of a lottery device, etc. (hereinafter, referred to as "state, type, etc." in some cases), based on the game related information acquired by the game related information acquirer 362, and determines the form of the display surface 410 in the movable display device 400 to be a form that corresponds to the identified "state, type, etc." (in some cases, only a state, such as "before start of a game", can be identified). To make this determination, the form determiner 363, for example, refers to form determination information stored in the storage unit 364.

The storage unit 364 stores as the form determination information, for example, information for determining a move position of each block in the display surface 410, for each "state, type, etc.", that may be identified by the form determiner 363. Specifically, for each "state, type, etc.", the storage unit 364 stores a table that defines a moving amount of each block in the display surface 410. Each block in the display surface 410 will now be described for convenience.

Figure 27:
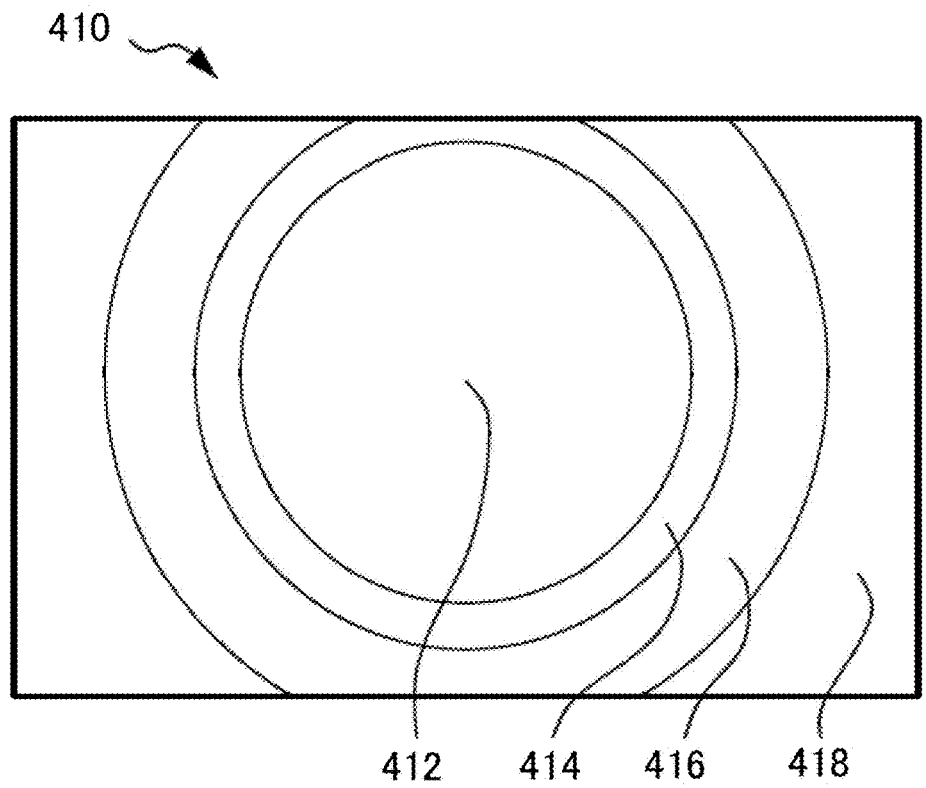
FIG. 27 is a diagram showing a configuration of the display surface.

FIG. 27 is a diagram showing the display surface 410 in the movable display device 400. As described above, the display surface 410 has a rectangular surface on which an image projected from the projector 450 is displayed, and is divided into four blocks as shown in the figure.

That is, in the present example, the display surface 410 is divided into four blocks of a circular central part 412 located approximately at the center, an inner ring part 414 adjacent to the central part 412, an outer ring part 416 adjacent to the inner ring part 414 on the outer side, and a side part 418 that is the remaining region.

The central part 412, the inner ring part 414, the outer ring part 416, and the side part 418 are configured independently movable in a direction of projection of the projector 450, i.e., to the front side and the back side along a direction perpendicular to the plane of the sheet in FIG. 27. This movement of each individual block is realized by, for example, a configuration in which a stepping motor (not shown) is provided so as to correspond to each block, and a rotation amount of each stepping motor is converted into a moving amount of a corresponding block in a moving direction.

Figures 28, 29:
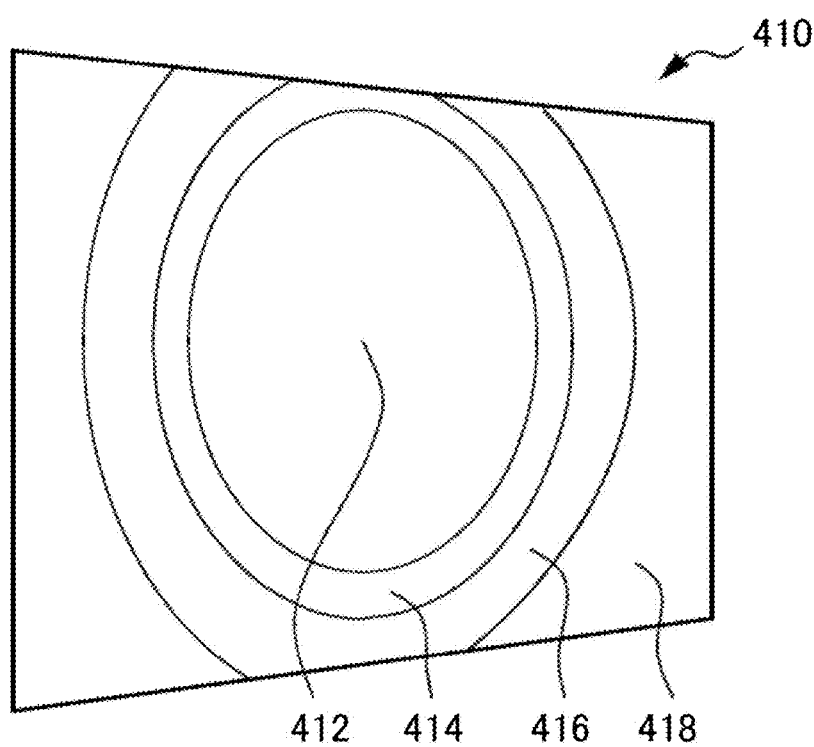
FIG. 28 is a diagram showing contents of a table stored in a storage unit.
FIG. 29 is a diagram showing an example of a change in form of the display surface.

FIG. 28 is a diagram showing an example of the table stored in the storage unit 364.

As shown in the figure, in the table, a moving amount of each block is defined for each "state, type, etc." The "state, type, etc.," as referred to herein means state, type, and the like identified based on at least one of the game information in the game related information and the information on the operation result generation device. In FIG. 28, seven examples are shown.

The moving amounts are defined using numerals accompanied by a positive or negative sign. The moving amounts are defined such that when the sign is positive, the block is moved in a direction approaching the projector 450 (player), and when the sign is negative, the block is moved in a direction of moving away from the projector 450. The numeral "1" defines that the block is to be moved by a moving amount of 100 mm; the numeral "2" defines that the block is to be moved by a moving amount of 200 mm. For example, "+1" defines that the block is to be moved by 100 mm in the direction of approaching the projector 450.

Under the "state, type, etc.," "before start (guidance time)" means a state before start of lottery of the local game or the common game. This information of "state, type, etc.," may be identified by the game information and the information on the operation result generation device when it is indicated that it is before start of a lottery of the local game or the common game. In this "before start", the moving amounts of the central part 412, the inner ring part 414, the outer ring part 416, and the side part 418 are defined to be reference zero. Since this state does not involve movement of any blocks, the display surface is flat.

Under the "state, type, etc.," "local game (in lottery)" means a state in which the local lottery device 330 is in a lottery in the local games S11 to S20. This information "state, type, etc.," may be identified by, for example, the game information indicating that the type of game is the individual game S1 (local games S11 to S20) and the information on the operation result generation device indicating that the local lottery device 330 is in a lottery. In this "local game (in lottery)", the moving amount of the central part 412 is defined to be "−1", and the respective moving amounts of the inner ring part 414, the outer ring part 416, and the side part 418 are defined to be zero.

Under the "state, type, etc.", "common bingo game (in lottery)" means a state in which the common bingo game S31 is in a lottery. This information of "state, type, etc." may be identified by, for example, the game information indicating that the type of game is the common bingo game S31 and also by the information on the operation result generation device indicating that the common lottery device 231 that is displayed as the movement image is in a lottery. In this "common bingo game (in lottery)", the moving amount of the central part 412 is defined to be "−1", and the respective moving amounts of the inner ring part 414, the outer ring part 416, and the side part 418 are defined to be zero.

Under the "state, type, etc.", "first common roulette game (in lottery)" means a state in which the first common roulette game S32 is in a lottery. This information of "state, type, etc.", may be identified by, for example, the game information indicating that the type of game is the first common roulette game S32 and by the information on the operation result generation device indicating that the common lottery device 232 that is displayed in the movement image is in a lottery. In this "first common roulette game (in lottery)", the moving amount of the central part 412 is defined to be "+1", and the respective moving amounts of the inner ring part 414, the outer ring part 416, and the side part 418 are defined to be zero. "Competition game (in lottery)" is substantially the same as "first common roulette game (in lottery)" except that the moving amount of the central part 412 is different, and thus, description thereof will be omitted.

Under the "state, type, etc.", "second common roulette game (in lottery)" means a state in which the second common roulette game S33 is in a lottery. This information of "state, type, etc.", may be identified by, for example, the game information indicating that the type of game is the second common roulette game S33 and by the information on the operation result generation device indicating that the common lottery device 233 displayed as the movement image is in a lottery. In this "second common roulette game (in lottery)", the moving amount of the central part 412 is defined to be "+1", the moving amount of the inner ring part 414 is defined to be zero, the moving amount of the outer ring part 416 is defined to be "+1", and the moving amount of the side part 418 is defined to be zero.

Under the "state, type, etc.", "second common roulette game (jackpot win time)" means a state in which, in the second common roulette game S33, a player playing at one of the game apparatuses 30 has won a jackpot. This information "state, type, etc." may be identified by, for example, the game information indicating that it is a state in which a player playing at one of the game apparatuses 30 has won a jackpot. In this "second common roulette game (jackpot win time)", the moving amount of the central part 412 is defined to be "+2", the moving amount of the inner ring part 414 is defined to be zero, the moving amount of the outer ring part 416 is defined to be "+2", and the moving amount of the side part 418 is defined to be "−1".

The form determiner 363 identifies the "state, type, etc.," of a game from the game related information acquired by the game related information acquirer 362, and obtains a moving amount corresponding to the identified game state by referring to the table stored in the storage unit 364. Accordingly, the form of the movable display device 400 is determined.

FIGS. 29 to 32 are diagrams showing specific representations of the display surface 410 of the movable display device 400 in different states of transformation described above. Unlike FIG. 27, these figures show the display surface 410 as viewed by a player sitting in a diagonal direction (the player P in FIG. 5). The state "first common roulette game (in lottery)" will not be shown.

Among the different representations, FIG. 29 is a diagram showing a form of the display surface 410 in the state "before start (guidance time)". Since the moving amount is zero in "before start", the display surface 410 is flat, as stated earlier.

Figure 30:
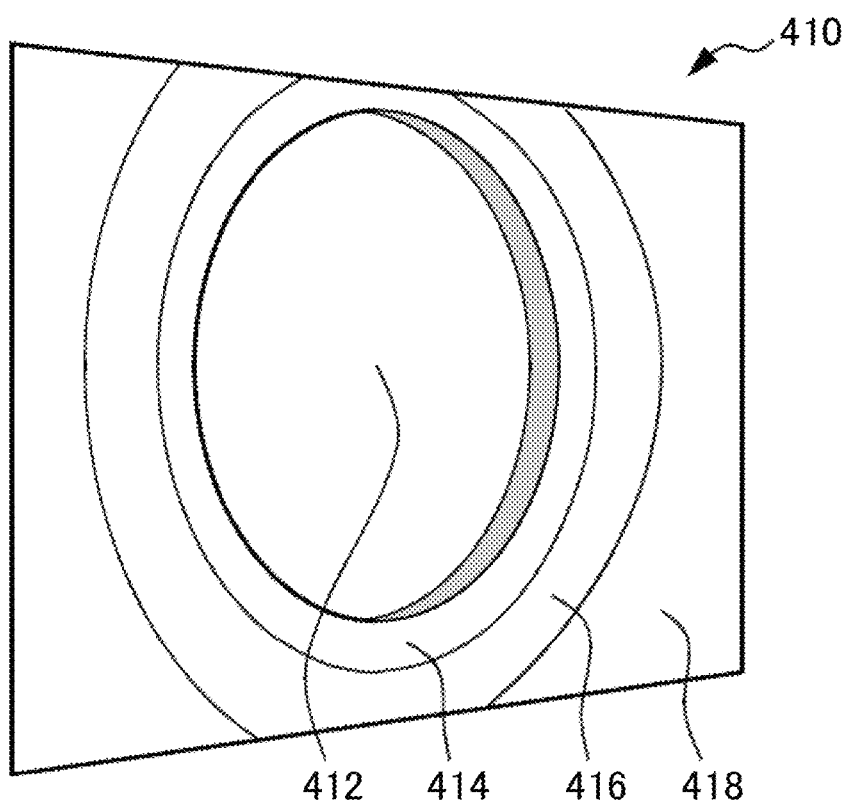
FIG. 30 is a diagram showing an example of a change in form of the display surface.

FIG. 30 is a diagram showing a form of the display surface 410 in the state "local game (in lottery)", "common bingo game (in lottery)" or "competition game (in lottery)". The moving amounts of the blocks in "local game (in lottery)", "common bingo game (in lottery)", and "competition game (in lottery)" are as described above, and the central part 412 moves one step, i.e., by 100 mm in the direction of moving away from the projector 450, so as to conform to the shape of the local lottery device 330 or the common lottery device 231. Thus, it appears to the player that the central part 412 is depressed one step. In FIG. 30, a shadow resulting from movement of the block is shown in gray (the same applies to FIGS. 31 and 32).

Figure 31:
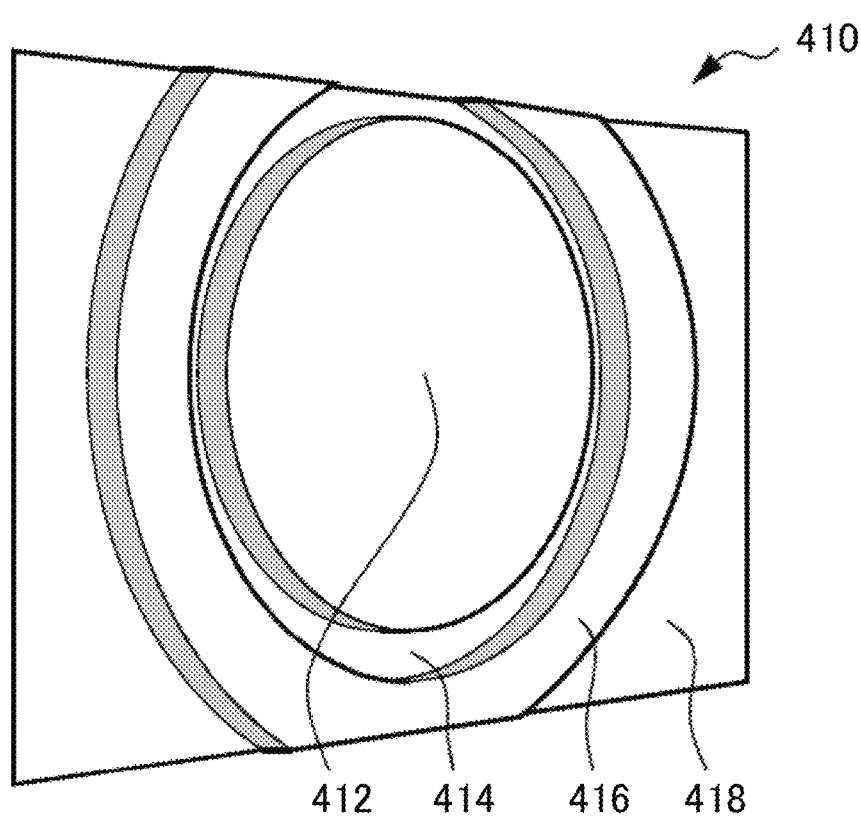
FIG. 31 is a diagram showing an example of a change in form of the display surface.

FIG. 31 is a diagram showing a form of the display surface 410 in the state "second common roulette game (in lottery)". The moving amounts of the blocks in "second common roulette game (in lottery)" are as described above, and in accordance with the shape of the common lottery device 233, each of the central part 412 and the outer ring part 416 moves one step in the direction approaching the projector 450. Thus, it appears to the player that the central part 412 and the outer ring part 416 protrude one step.

Figure 32:
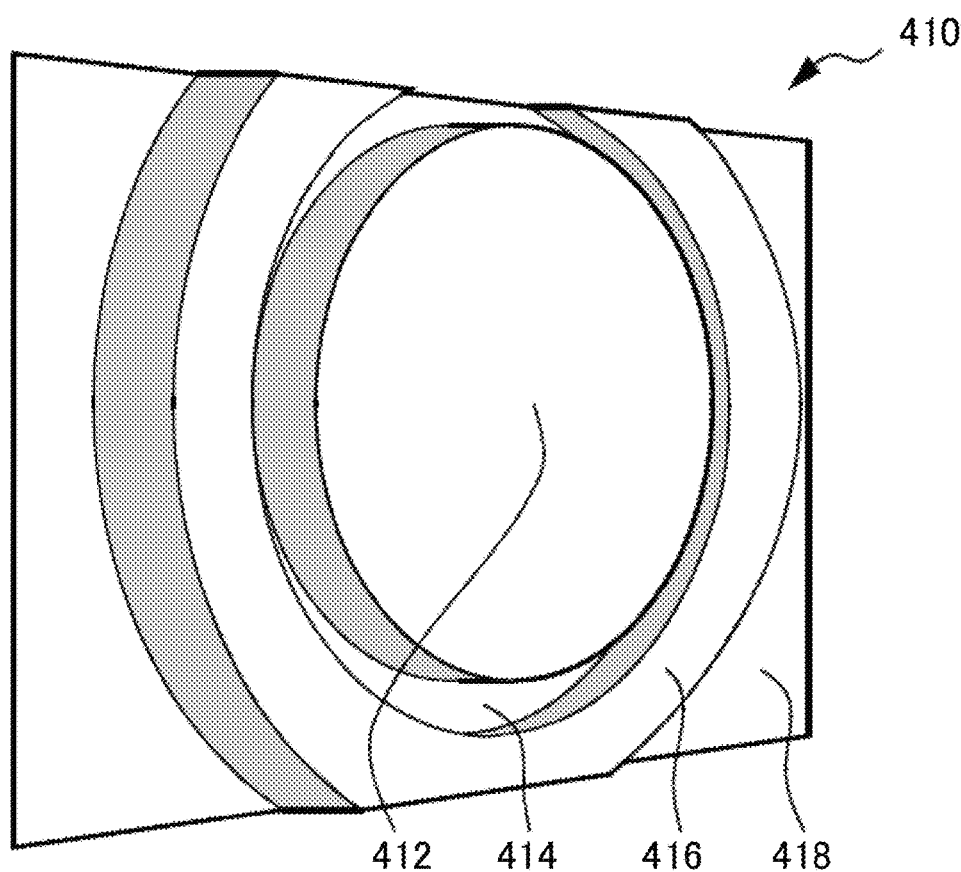
FIG. 32 is a diagram showing an example of a change in form of the display surface.

FIG. 32 is a diagram showing a form of the display surface 410 in the state "second common roulette game (jackpot win time)". The moving amounts of the blocks in "second common roulette game (jackpot win time)" are as described above, and each of the central part 412 and the outer ring part 416 moves two steps in the direction of approaching the projector 450 and the side part 418 moves one step in the direction of moving away from the projector 450. Thus, it appears to the player that the central part 412 and the outer ring part 416 protrude three steps relative to the side part 418 serving as a reference.

FIGS. 33 to 36 are diagrams showing examples in which the projector 450 projects a moving image onto the display surface 410 in the transformed states described above. The state "first common roulette game (in lottery)" will not be shown in a diagram.

Figure 33:
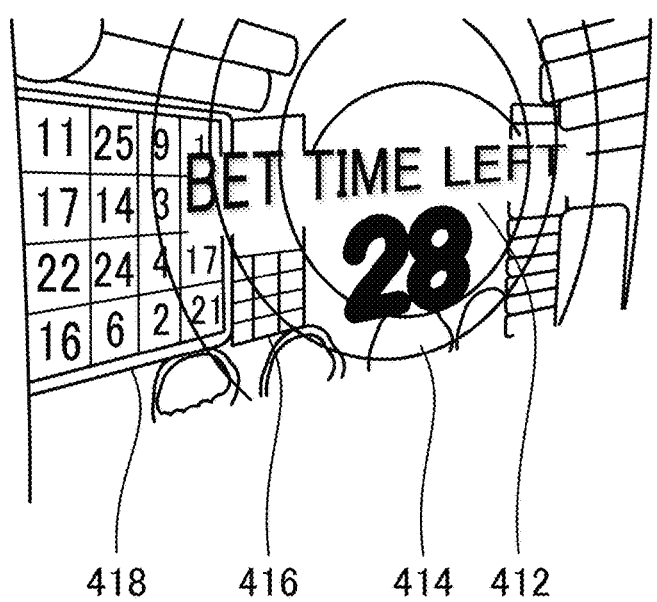
FIG. 33 is an example of a moving image projected onto the display surface after change.

Among the diagrams, FIG. 33 is a diagram showing a display example of the display surface 410 in the state "before start (guidance time)". In "before start (guidance time)", the display surface 410 is flat, so it is possible to avoid reducing readability when the player reads various guidance or explanation displayed.

Figure 34:
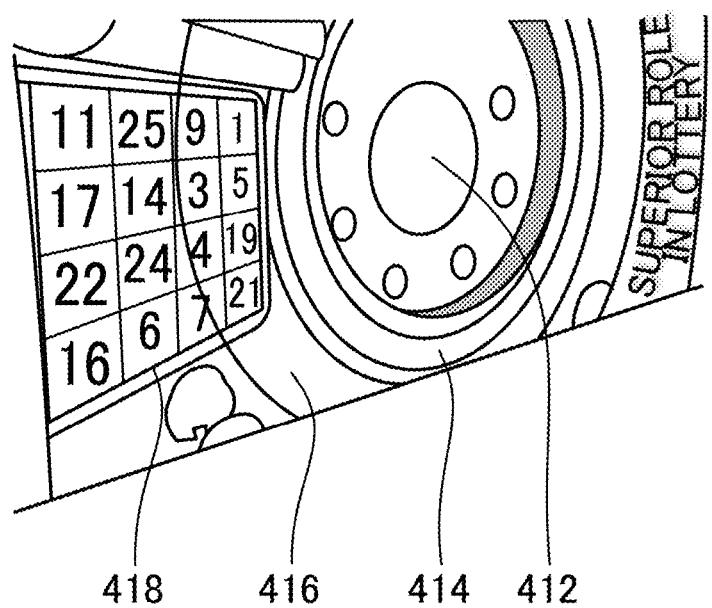
FIG. 34 is an example of a moving image projected onto the display surface after change.

FIG. 34 is a diagram showing a display example of the display surface 410 in the state "local game (in lottery)", "common bingo game (in lottery)", or "competition game (in lottery)". In "local game (in lottery)", "common bingo game (in lottery)", or "competition game (in lottery)", the central part 412 of the display surface 410 is depressed one step so as to conform to the shape of the local lottery device 330 or the common lottery device 231. Therefore, a view of a lottery of the local lottery device 330 or the common lottery device 231 can be presented to the player in a moving image that has a three-dimensional appearance in contrast to a flat appearance. Specifically, the central part 412 depressed one step relative to the inner ring part 414 can be viewed as a field in which the ball B spins, and the inner ring part 414 can be viewed as a wall part for preventing the ball B from falling off to the outside.

Figure 35:
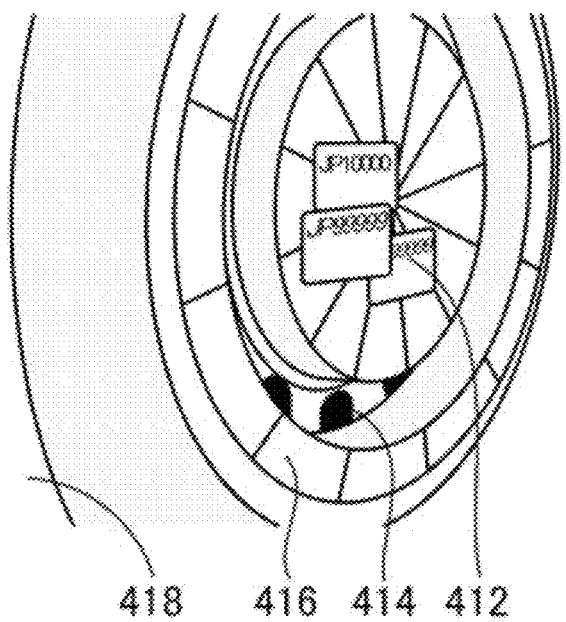
FIG. 35 is an example of a moving image projected onto the display surface after change.

FIG. 35 is a diagram showing a display example of the display surface 410 in the state "second common roulette game (in lottery)". In "second common roulette game (in lottery)", the central part 412 and the outer ring part 416 of the display surface 410 protrude one step so as to conform to the shape of the common lottery device 233. Therefore, a view of a lottery operating at the common lottery device 233 can be presented to the player in a moving image that has a three-dimensional appearance rather than a flat appearance. Specifically, the inner ring part 414 interposed between the central part 412 and the outer ring part 416 can be viewed as a path (a part of which has the pockets 338) in which the ball B moves.

Figure 36:
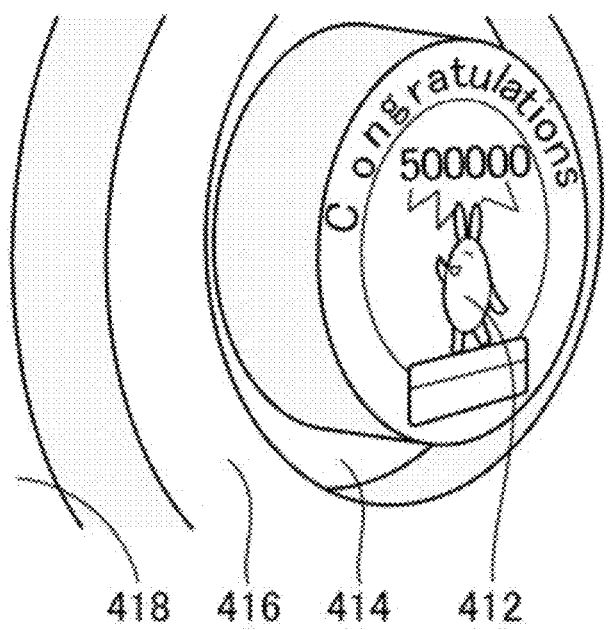
FIG. 36 is an example of a moving image projected onto the display surface after change.

FIG. 36 is a diagram showing a display example of the display surface 410 in the state "second common roulette game (jackpot win time)". In "second common roulette game (jackpot win time)", the central part 412 and the outer ring part 416 of the display surface 410 protrude three steps relative to the side part 418, and therefore, a moving image with stage effects for congratulating the player who has obtained the jackpot can be presented to the player more conspicuously compared to the flat state.

As described above, a moving image is projected from the projector 450 onto a display surface with its form being changed in accordance with a game state. Thus, compared to a configuration in which the moving image is projected onto the display surface 410 that is always flat, a more realistic feeling that is in accordance with a situation of the moment can be given to the player.

Moreover, in the present example a physical lottery device included in a single game apparatus 30 is the local lottery device 330 only, but movement images of the plurality of other common lottery devices 231 to 233 are displayed on the display surface 410 and operation results thereof are used. Accordingly, while using operation results of physical mechanism, problems such as structural complexity and large housing size are reduced. Furthermore, in the game apparatus 30, the display surface 410 is divided into a plurality of blocks, and by moving at least one or all of the blocks (at least one block), a form of the display surface can be changed so as to conform to the shape of a lottery device, a progress status of a game, and an operation state of the lottery device, and moreover, to types of game and lottery device. There is also an advantage that it is possible to easily respond to changes in lottery devices and games.

It is of note that the number of blocks into which the display surface 410 is divided may of course be other than "four". Preferably, the number and shape of blocks into which the display surface 410 is divided are decided in accordance with, for example, a shape of the lottery device to be displayed on the display surface 410. In the example shown in FIG. 28, the moving amount of the inner ring part 414 is zero in any of the game states; however, the moving amount may be a value other than zero. In other words, all of the blocks into which the display surface 410 is divided may be moved, or only some thereof may be moved.

The moving directions of the blocks of the display surface 410 may be other than the directions of approaching or moving away from the projector 450. For example, the side part 418 may be moved in each of a direction of approaching a center or a direction of moving away from the center. An upper side of the outer ring part 416 may be made immovable and a lower side thereof may be moved to the front side relative to the plane of the sheet, or the lower side of the outer ring part 416 may be made immovable and the upper side thereof may be moved to the closer side.

In any way, the moving directions of the blocks preferably include directions unlikely to generate a portion on which a moving image is not projected (shadow) when the moving image is projected from the projector 450. In other words, the moving directions of the blocks preferably include direction components of approaching or moving away from the projector 450. Conversely, such a shadow may be generated rather willingly, so that a moving image is expressed more three-dimensionally.

Next, a configuration related to moving image distribution control in the common game S3, etc., which is the second characteristic portion, will be described. As described above, during a lottery of the common game S3 or the competition game S5, a movement image projected onto the display surface 410 is a lottery moving image by any one of the common lottery devices 231 to 233, and is displayed at a plurality of game apparatuses 30 at a common timing.

Since data of the movement image is generally in a large amount, in a case in which an attempt is made to distribute the lottery moving image of the common lottery devices 231 to 233 in real time, progress of a common game in which players of a plurality of game apparatuses 30 participate would be difficult if, for example, there is not enough bandwidth of the network N.

In the present example, roughly speaking, the game apparatus 30 downloads a plurality of sets of a movement image of a predetermined unit and operation history information related to the movement image, from the common lottery game data center 20 (moving image database 246) before execution of the common game S3 and the competition game S5, and at the time of executing the common game S3, the common game server 10 determines a movement image to be played at the plurality of relevant game apparatuses 30, and instructs each game apparatus 30 to play the determined moving image at a common timing.

Accordingly, since an already downloaded movement image is simply played at the instructed timing at the plurality of game apparatuses 30, it is possible to make the common game less likely to be affected by a network state in progressing a game in which the players of the plurality of game apparatuses 30 participate.

Figure 37:
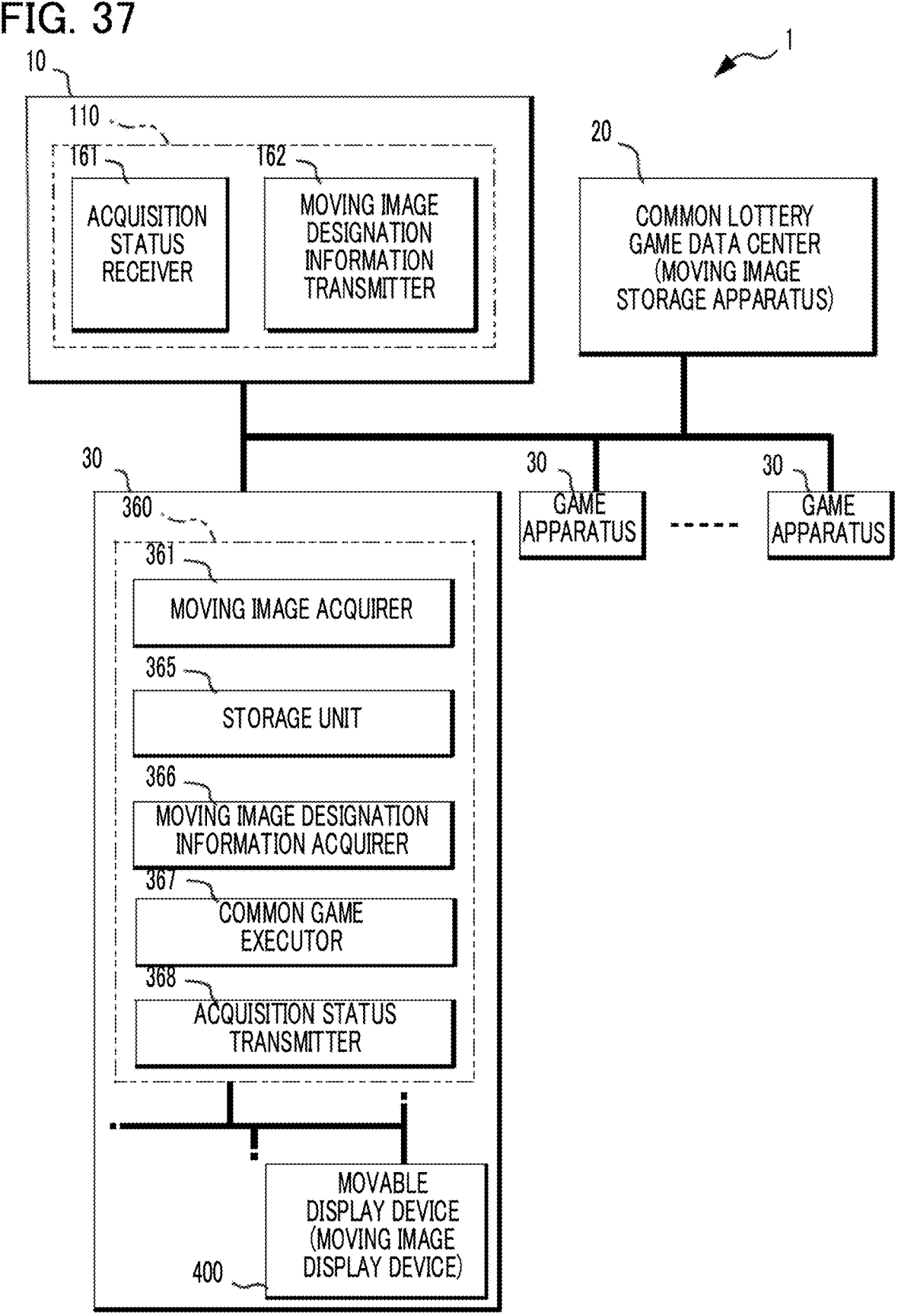
FIG. 37 is a diagram showing functional blocks of a configuration for controlling a movement image of a common game.

FIG. 37 is a block diagram showing functions configured by respective elements of the game system 1 in executing control related to movement images of the common game (the common game S3 or the competition game S5).

As shown in the figure, an acquisition status receiver 161 and a moving image designation information transmitter 162 are configured by the common game controller 110 of the common game server 10. That is, the acquisition status receiver 161 and the moving image designation information transmitter 162 are realized by the common game controller 110 executing a predetermined computer program and functioning in accordance with the computer program.

The acquisition status receiver 161 receives acquisition statuses of movement images from the plurality of relevant game apparatuses 30. The moving image designation information transmitter 162 performs the following three processes in a case in which the acquisition status of movement images is received from each of the plurality of game apparatuses 30. First, the moving image designation information transmitter 162 selects one of the movement images of a predetermined unit acquired in common for the plurality of game apparatuses 30; second, it determines the selected movement image to be the movement image to be displayed in common among the plurality of relevant game apparatuses 30; and third, it transmits moving image designation information designating the movement image to each of the plurality of relevant game apparatuses 30. The moving image designation information includes, for example, a condition in playing the designated movement image at the game apparatuses 30 (starting time point, playback speed, etc.).

The moving image acquirer 361, a storage unit 365, a moving image designation information acquirer 366, a common game executor 367, and an acquisition status transmitter 368 are configured by the game machine controller 360 of the game apparatus 30. That is, the moving image acquirer 361, the storage unit 365, the moving image designation information acquirer 366, the common game executor 367, and the acquisition status transmitter 368 are realized by the game machine controller 360 executing a predetermined computer program and functioning in accordance with the computer program.

The moving image acquirer 361, as described above, acquires a plurality of movement images to be displayed on the movable display device 400 in a predetermined unit, and specifically, the movement images are acquired by downloading from the common lottery game data center 20 serving as a moving image storage apparatus. The movement image of a predetermined unit means a moving image corresponding to a series of captured operation processes, of the operation result generation device, that is to serve as one unit (one segment) in a game. In the common bingo game S31 described above, in one game eight balls B are fed to the common lottery device 231 and the bingo is settled based on the positions of the pockets 238 into which the balls have fallen. In this case, the movement image of a predetermined unit is, for example, a moving image from a timing immediately before the first ball B is fed to the common lottery device 231 to a timing immediately after the eighth ball B has fallen into a pocket 238. In the first common roulette game S32, 40 balls B are fed to the common lottery device 232 in one game and the game is settled based on positions of the pockets 238 into which two or more balls B have fallen. In this case, the movement image of a predetermined unit is, for example, a moving image from a timing immediately before the first ball B is fed to the common lottery device 232 to a timing immediately after the 40th ball B has fallen into a pocket. In the second common roulette game S33, one ball B is fed to the common lottery device 233 in one game and a result is determined in accordance with a position of the pocket 238 that the fed one ball B has entered. In this case, the movement image of a predetermined unit is, for example, a moving image from a timing immediately before the one ball B is fed to the common lottery device 233 to a timing immediately after the one ball B has fallen into a pocket 238. In the competition game S5, three balls B are fed to the common lottery device 231 in one turn for the superior role and the inferior role takes a turn after the three balls B have fallen into pockets 238. In this case, the movement image of a predetermined unit is, for example, a moving image from a timing immediately before the first ball B is fed to the common lottery device 231 to a timing immediately after the third ball B has fallen into a pocket 238. Each movement image of a predetermined unit is assigned with a unique identifier.

The storage unit 365 stores movement images of a predetermined unit, acquired by the moving image acquirer 361.

The moving image designation information acquirer 366 receives moving image designation information transmitted from the moving image designation information transmitter 162.

The common game executor 367 executes a common game so as to conform to the display of a movement image designated in the moving image designation information. For example, in the common bingo game S31, the common game executor 367 makes a square corresponding to a position of the pocket 238 into which a ball B has fallen turn valid in a generated bingo card, counts the number of bingo lines, and reports the number of bingo lines to the common game controller 110. It is of note that the common game executor 367, in actuality, may be configured, by the game machine controller 360 and the station controller 370 working in coordination with each other.

The acquisition status transmitter 368 transmits an acquisition status of movement images stored in the storage unit 365 to the common game controller 110 (the acquisition status receiver 161), in the form of a list of identifiers of the movement images.

Figure 38:
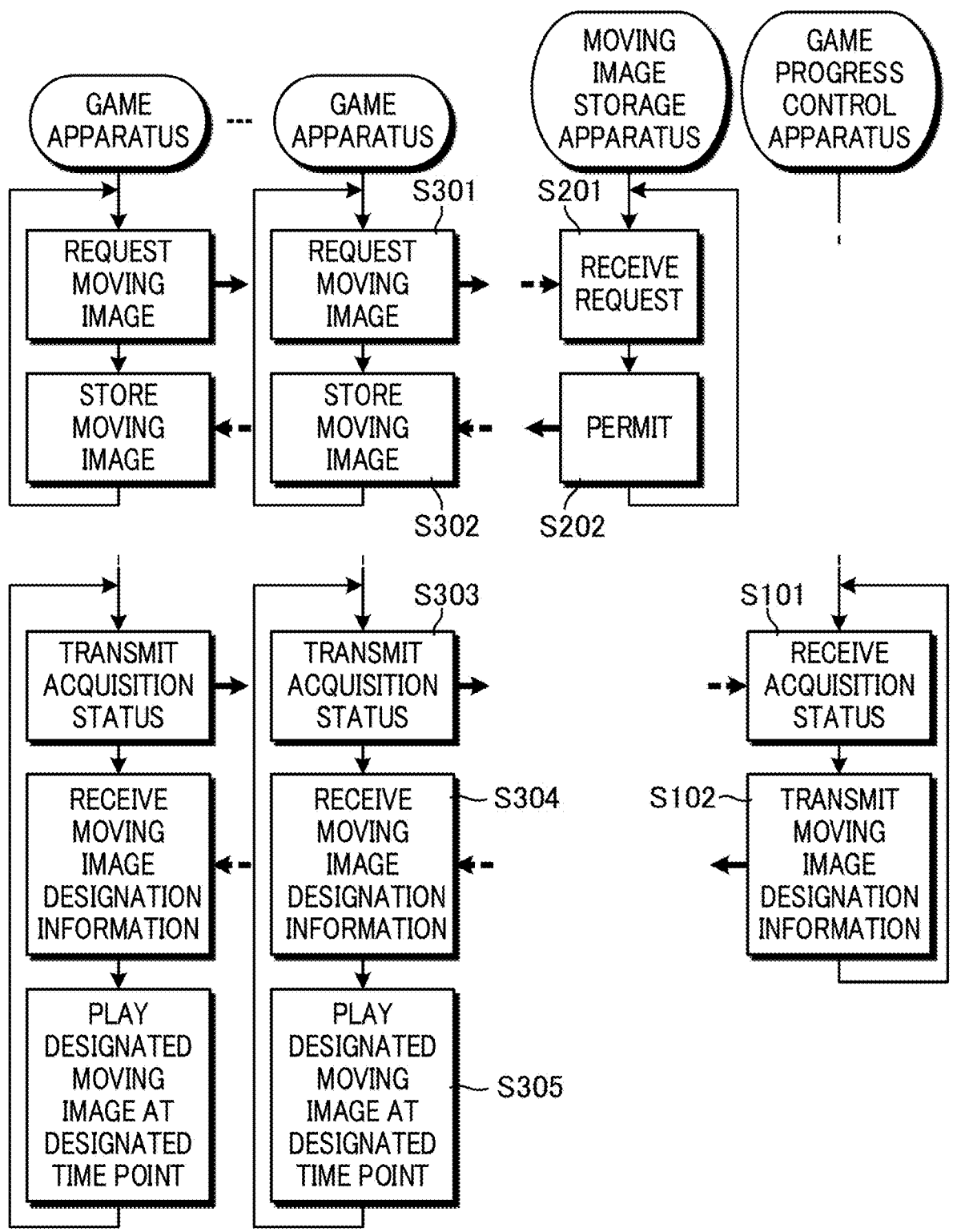
FIG. 38 is a flowchart showing a flow of control operation of a movement image.

FIG. 38 is a flowchart showing a flow of operation of respective apparatuses in a case in which control related to moving image display of a common game is executed. As described above, the common game includes the common game S3 and the competition game S5. In the following, the common game S3 is described as an example.

In this figure, in each of the plurality of game apparatuses 30, the moving image acquirer 361, for example, requests for moving images to the common lottery game data center 20 serving as the moving image storage apparatus (step S301). The common lottery game data center 20 serving as the moving image storage apparatus, upon receiving the request (step S201), permits each game apparatus 30 to download movement images (step S202).

According to this permission, the moving image acquirer 361 of the game apparatus 30 downloads and acquires movement images of a predetermined unit and stores the movement images in the storage unit 365 (step S302). The movement images downloaded at this time may be a moving image file of each divided moving image corresponding to a predetermined unit, or a moving image file including a plurality of movement images of a predetermined unit. Each movement image of a predetermined unit is associated with operation history information, and the operation history information is also downloaded together when the movement image is downloaded. Preferably, the order of the movement images downloaded is set to be common to the respective game apparatuses 30, but may also be different among the game apparatuses 30.

Such acquisition operation of movement images is executed repeatedly. The acquisition operation is executed for each of the plurality of game apparatuses 30. As a result, in each of the plurality of game apparatuses 30, a plurality, e.g., several thousands, of movement images are stored in the storage unit 365.

Before execution of the common game S3, for example in the background while executing the individual game S1, the acquisition status transmitter 368 of the game apparatus 30 transmits the list of the movement images stored in the storage unit 365 as the acquisition status of the movement images, to the common game server 10 serving as the game progress control apparatus (step S303). Such transmission of an acquisition status is executed by each of the plurality of game apparatuses 30.

Each time an acquisition status is transmitted from a game apparatus 30, the acquisition status receiver 161 of the common game server 10 receives the acquisition status in association with the game apparatus 30 (step S101). Accordingly, the common game server 10 is informed of which movement images are acquired by each of the plurality of game apparatuses 30.

Next, the moving image designation information transmitter 162, before execution of the common game S3, selects one of the movement images acquired in common by the plurality of game apparatuses 30, and determines the selected movement image to be the movement image to be displayed in common among the plurality of game apparatuses 30. Then, the moving image designation information transmitter 162 transmits moving image designation information designating the movement image together with a condition for playback, to each of the plurality of game apparatuses 30 related to the common game S3 (step S102).

At the game apparatus 30, the moving image designation information acquirer 366 receives (acquires) the moving image designation information (step S304).

When the moving image designation information is acquired at the game apparatus 30, the movement image designated in the moving image designation information is read from the storage unit 365, and the projector 450 is controlled so as to play the movement image in accordance with the condition included in the moving image designation information (step S305). Accordingly, at the plurality of game apparatuses 30 related to the common game S3, the movement image designated in the moving image designation information is displayed at approximately the same timing on the respective display surfaces 410.

The common game S3 by the common game executor 367 is executed at the stations of the players participating in the common game S3 among the stations of the plurality of game apparatuses 30.

The game apparatus 30 plays the movement image designated in the moving image designation information, from among a plurality of sets of movement images downloaded from the common lottery game data center 20 and stored in the storage unit 365. Accordingly, it is possible to make the common game less likely to be affected by a network state in progressing a game in which the players of the plurality of game apparatuses 30 participate.

Players who can participate in the common game S3 are only those who satisfy a predetermined condition (in the example of the common bingo game S31, having acquired seven or more participation items in the individual game S1). Thus, depending on a game apparatus 30, there may be a case in which no player participates in the common game S3. To deal with this situation, the common game server 10 serving as the game progress control apparatus acquires information on game apparatuses 30 that need to execute the common game S3. Specifically, the common game server 10 acquires information on one or more game apparatuses 30 in which players to participate in the common game S3 are present, and permits participation in the common game S3 only for the one or more game apparatuses 30 concerned. The game apparatus 30 (the acquisition status transmitter 368) transmits an acquisition status of movement images to the acquisition status receiver 161 only when participation in the common game S3 is permitted. As described above, a movement image is played based on transmission of an acquisition status of movement images (step S303) and reception of moving image designation information (step S304). Therefore at a game apparatus 30 that does not execute step S303, playback of a movement image will be omitted.

In the foregoing, control related to movement images of a common game is described using the common game S3 as an example. Substantially the same control is applicable for the competition game S5.

Next, description will be given of a configuration related to attribute setting of each player in a game apparatus 30, which is the third characteristic portion. Generally, attributes set with regard to pockets of a lottery device shared by a plurality of players are unchanged. There are lottery devices in which attributes set with regard to pockets change, but the change does not agree with the intentions of players participating in a lottery in some cases.

In the present example, a numeral (an example of an attribute) of one or a plurality of pockets (an example of a partial region of a movement image of an operation result generation device that generates a physical operation result used in a game) is settable by each player separately. In such a configuration, the intention of a player can be reflected in a setting of an attribute that may affect a game result, and diverse kinds of lottery can be performed with a simple configuration. The configuration will be described below.

Figure 39:
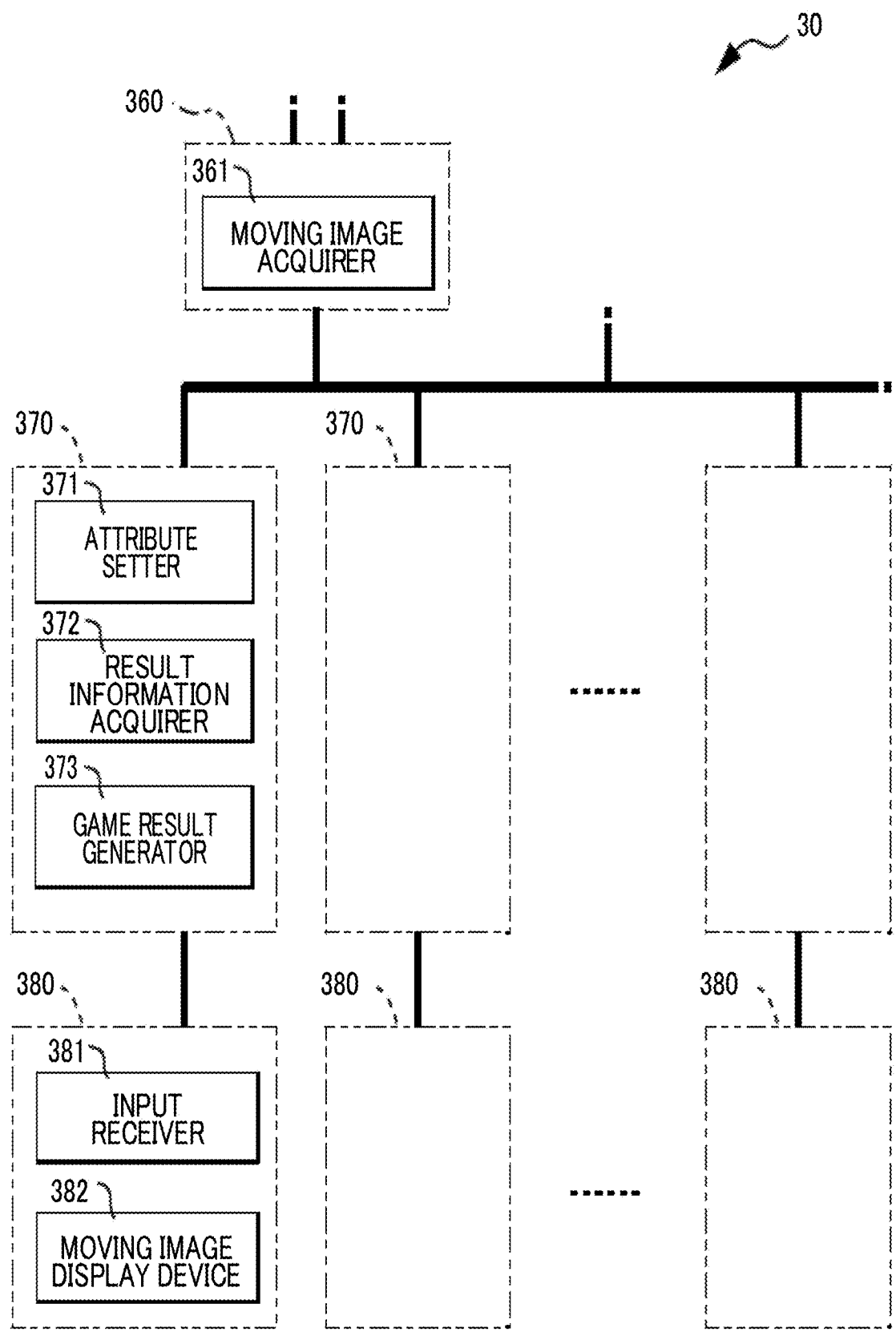
FIG. 39 is a diagram showing functional blocks of a configuration for setting an attribute.

FIG. 39 is a block diagram showing functions configured by the game apparatus 30, in particular by each of the game machine controller 360, the station controller 370, and the touch panel display 380, in a case in which an attribute for each player is set at each game apparatus 30.

As shown in the figure, the moving image acquirer 361 is configured by the game machine controller 360 of the game apparatus 30. The moving image acquirer 361 is realized by the game machine controller 360 executing a predetermined computer program and functioning in accordance with the computer program.

The moving image acquirer 361 here acquires a movement image to be presented to a player via the touch panel display 380. For example, in the individual game S1, the moving image acquirer 361 acquires a movement image of a lottery by the local lottery device 330 of the subject game apparatus 30. In the common bingo game S31, the moving image acquirer 361 acquires a movement image of a lottery by the common lottery device 231.

An attribute setter 371, a result information acquirer 372, and a game result generator 373 are configured by the station controller 370. An input receiver 381 and a moving image display device 382 are configured by the station controller 370 and the touch panel display 380. The attribute setter 371, the result information acquirer 372, and the game result generator 373 are realized by the station controller 370 executing a predetermined computer program and functioning in accordance with the computer program.

The input receiver 381 and the moving image display device 382 are realized by the station controller 370 executing a predetermined computer program and controlling the touch panel display 380 in accordance with the computer program.

The input receiver 381 receives a touch operation performed by a finger of the player, etc. The touch operation includes, for example, a tap operation of tapping with a finger to select an object displayed on a screen, a flicking operation of lightly flicking the object with a finger, a dragging operation of moving the object while touching with a finger, and a pinching operation of, while contacting the screen with two fingers, widening or narrowing the distance therebetween.

The moving image display device 382 displays a moving image based on the movement image acquired by the moving image acquirer 361. The moving image displayed by the moving image display device 382 includes movement images showing a lottery of any of the local lottery device 330 and the common lottery devices 231 to 233, and also an image obtained by carrying out image processing on the movement image (e.g., a movement image on which a moving image showing an attribute is superimposed), or the like.

The attribute setter 371, in the case of the local lottery device 330, sets an attribute to each of the 16 pockets 338 based on a player operation received through the input receiver 381. It is of note that in each of the 16 pockets 338, a default attribute is set in advance, and if the attribute setter 371 does not receive a relevant player operation at the input receiver 381 during the bet time or the thinking time, the attributes set as defaults will be used as they are.

The result information acquirer 372 acquires information indicative of a physical operation result of the operation result generation device. The information indicative of a physical operation result in the present example is information indicative of a lottery result of the local lottery device 330, or a lottery result of one of the common lottery devices 231 to 233, and specifically, is information indicative of one or more pockets 238, 338 of a lottery device into which a ball B has fallen. The result information acquirer 372 can acquire the information indicative of a lottery result of the local lottery device 330, for example, based on output of the sensor provided at each of the pockets 338 of the local lottery device 330. The result information acquirer 372 can acquire the information indicative of a lottery result of any of the common lottery devices 231 to 233, for example, based on operation history information of the corresponding one of the common lottery devices 231 to 233 that outputs the lottery result. It is also conceivable to acquire information indicative of a lottery result by analyzing a lottery moving image.

The game result generator 373 uses the information indicative of an operation result, acquired by the result information acquirer 372, and the attribute set by the attribute setter 371, to generate a game result for a player. As the game result for a player, information on whether or not a prize is won, a reward to be granted to the player, etc., is generated, for example. Examples of the reward include a payout, an item, a right to perform a predetermined lottery, etc.

In the present example, since eight stations are provided in one game apparatus 30, eight pairs of station controllers 370 and touch panel displays 380 are provided. In other words, attribute setting in a game apparatus 30 can be performed for each station (for each player).

In the following, description will be given of an example using the local lottery device 330. Substantially the same explanation applies to the common lottery devices 231 to 233. FIGS. 40 to 43 are diagrams showing examples of setting of attributes in the "local game No. 3".

In each figure, a movement image obtained by the camera 321 capturing the local lottery device 330 is shown in an upper portion, an image showing attributes set to the pockets 338 in the movement image is shown in a middle portion, and a moving image (a moving image obtained through image processing of the movement image) in which the image of the middle portion is placed (superimposed) on top of the movement image of the upper portion is shown in a lower portion. There is displayed on the moving image display device 382 a superimposed moving image such as that shown in the lower portion.

Figure 40:
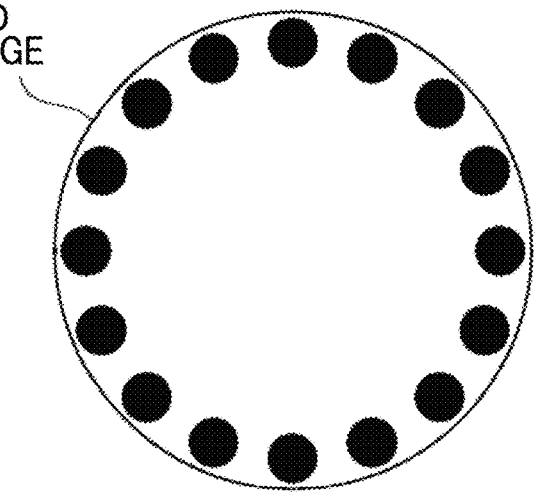
FIG. 40 is a diagram showing an example of setting of an attribute.
Figure 40:
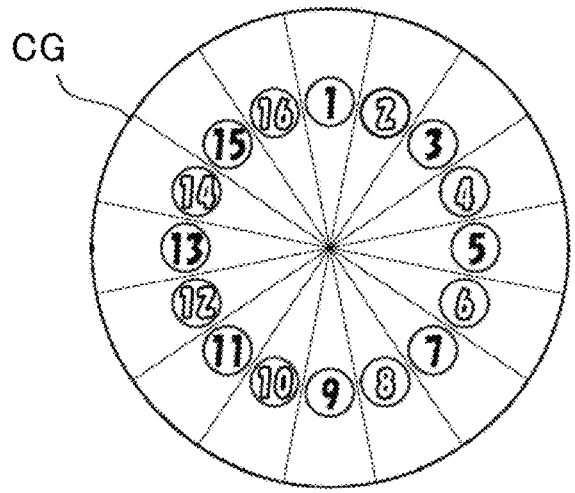
Figure 40:
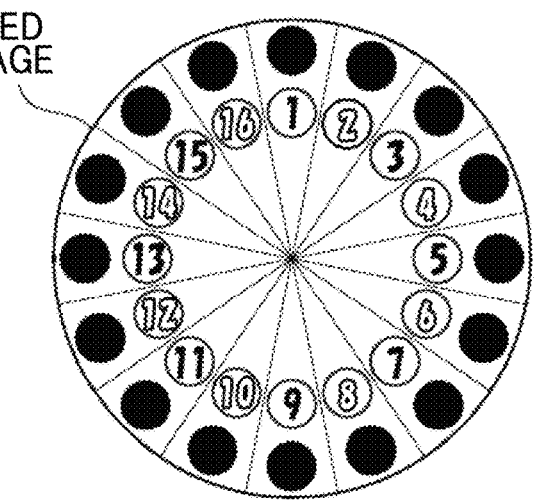

An image superimposed on the movement image is changed depending on a kind of game. In the case of the "local game No. 3", an image, such as that shown in FIG. 40, is superimposed. In the case of the "local game No. 1", as shown in FIG. 15, an image of a freight train M is superimposed. In the case of the "local game No. 2", as shown in FIG. 16, an image of blocks in five colors arranged in six rows and six columns is superimposed. A kind of game displayed on the circular portion of the touch panel display 380 is switched by a selection operation of a player. The selection operation of a game is performed, for example, by selecting one of small images that are displayed on the rectangular portion of the touch panel display 380 and that correspond to the respective games.

As described above, in the pockets 338 in the local lottery device 330, numbers from "1" to "16" located clockwise starting from a pocket at 12 o'clock are set as defaults.

The middle portion in FIG. 40 shows a case in which the numbers set to the respective 16 pockets 338 are used as they are as default attributes. In this case, a superimposed moving image is displayed on the moving image display device 382 as shown in the lower portion, and a state in which the numbers from "1" to "16" are set to the 16 pockets 338 on a one-on-one basis is presented to the player.

In the "local game No. 3", for example, in a case in which it is found from the operation result information that a ball B has fallen into the pocket 338 to which the number of "3" is set, the square of "3" will turn valid in the bingo card.

During the bet time and the thinking time, the player may change setting of numbers for the pockets 338 by performing on the input receiver 381 an operation of switching numbers of the pockets 338. For example, in FIG. 40, in a case in which an operation of switching between "1" and "11" is performed, positions "1" and "11" will switch (not shown in the drawing).

Figure 41:
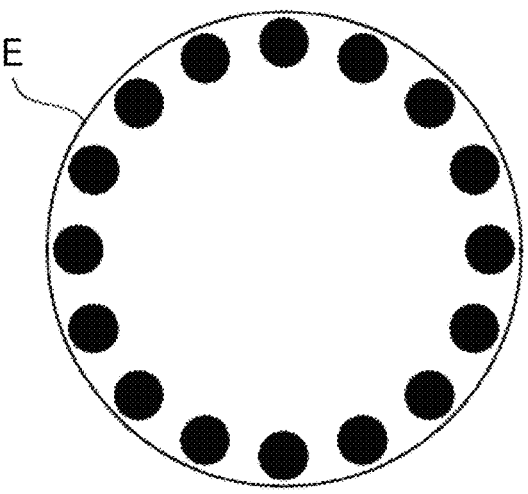
FIG. 41 is a diagram showing an example of setting of an attribute.
Figure 41:
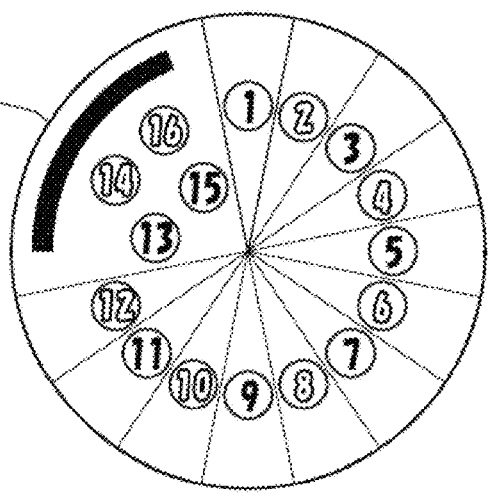
Figure 41:
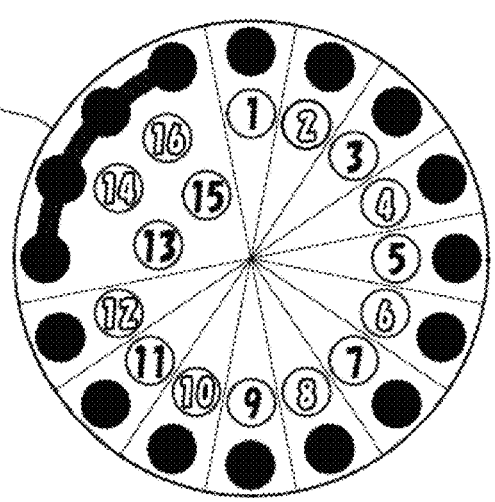

Moreover, in a case in which, during the bet time and the thinking time, the player performs on the input receiver 381 an operation of linking the numbers "13" to "16" to change the setting of numbers shown in FIG. 40, the pockets from "13" to "16" will be treated as one same pocket, as shown in the middle portion in FIG. 41. Accordingly, for example, when a ball B falls into any of the pockets 338 from "13" to "16", squares having any of the numbers from "13" to "16" (see FIG. 18) will be valid in the bingo card.

Thus, since in the pockets to which the numbers from "13" to "16" are set, the probability of the pockets becoming valid is four times as great, and an effect as if areas of the regions to which these numbers are set (here, areas of the pockets) were enlarged is brought about in a game. Moreover, a display that visually shows as if an area of the pockets were enlarged may be imparted in the superimposed moving image displayed on the moving image display device 382.

Linking numbers is not limited to adjacent pockets.

Figure 42:
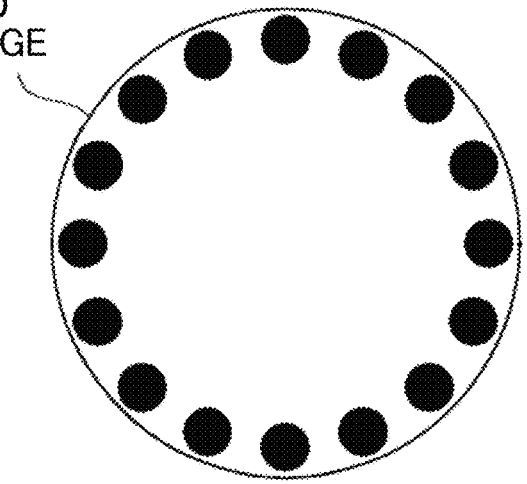
FIG. 42 is a diagram showing an example of setting of an attribute.
Figure 42:
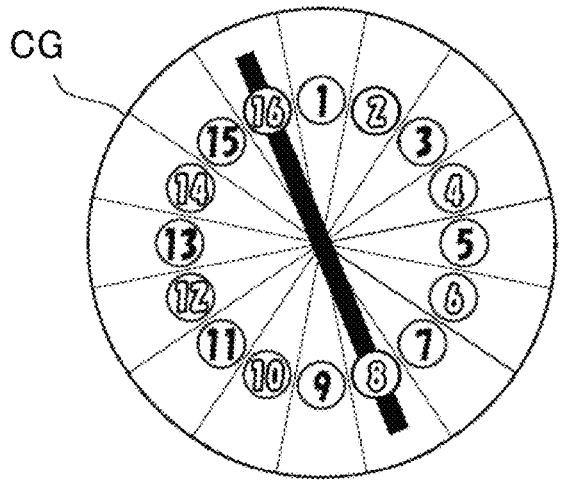
Figure 42:
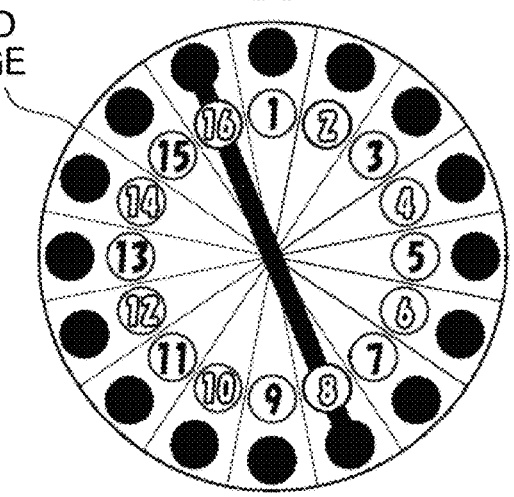

For example, in a case in which, during the bet time and the thinking time, the player changes a setting of the numbers, by performing on the input receiver 381 an operation of merging the number "8" and the diagonally located number "16", the pockets "8" and "16" will be treated as being one same pocket, as shown in the middle portion in FIG. 42. Accordingly, for example, if a ball B falls into either one of pockets 338 of "8" and "16", the squares having either "8" or "16" will be valid in the bingo card. Thus, since the probability of the pockets becoming valid is twice as great in the pockets to which the numbers of "8" and "16" are set, an effect as if an area of the pockets were enlarged is brought about in a game, similarly to the above.

Figure 43:
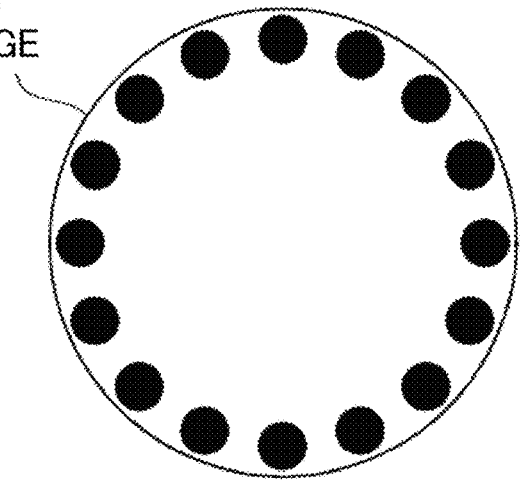
FIG. 43 is a diagram showing an example of setting of an attribute.
Figure 43:
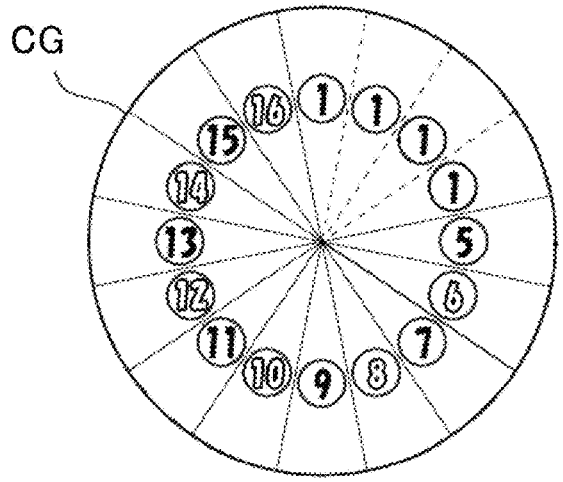
Figure 43:
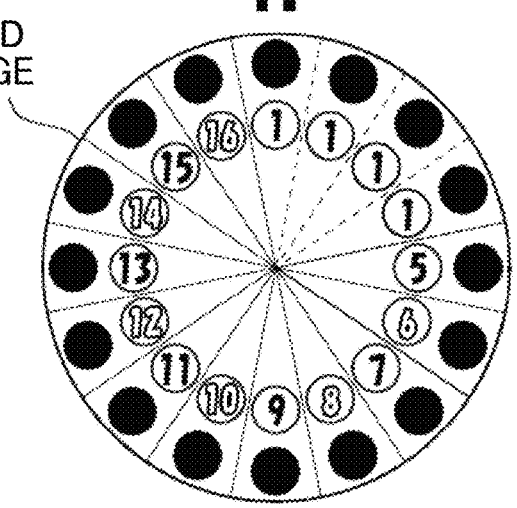

Moreover, for example, when, during the bet time and the thinking time, the player changes the setting of the numbers shown in FIG. 40, by performing on the input receiver 381 an operation of enlarging an area of the number "1" so as to correspond to four pockets in a clockwise direction, the numbers from "2" to "4" will be treated as the number "1", as shown in the middle portion in FIG. 43.

Accordingly, in the bingo card, the probability of the square of "1" becoming valid will jump four times, whereas the squares of "2" to "4" will be nullified. Moreover, in the superimposed moving image displayed on the moving image display device 382, a display that visually shows as if an area of the pockets were enlarged may be imparted.

Use of credit, use of item, and/or the like may be used as conditions for changing numbers to be set in the pockets 338.

Here, the "local game No. 3" is used as an example of setting an attribute to a partial region of the lottery moving image. Substantially the same setting can be made in the "local game No. 1" (see FIG. 15), the "local game No. 2" (FIG. 16), etc. For example, in the "local game No. 1", as an attribute, the number of freight cars of the freight train M may be changed, for example, thereby setting the number of pockets 338 to be valid (whether a freely-selected pocket will be valid is determined when a ball B falls into that pocket, based on whether the freight train M is located in front of the pocket 338). In the "local game No. 2", as attributes, the six-row and six-column arrangement of the blocks may be changed to set blocks associated with the respective pockets 338. Examples of arrangement of the blocks include an angle of the entire arrangement of blocks, positional relationships between blocks, etc.

In the present example, in a case in which a lottery result of a common lottery device is used to execute the game among players, attributes for regions of the lottery device can be set for each player. Therefore, each player can play the game, while considering intentions, on the lottery device.

In the description above, the operation result generation device is described using a roulette-type lottery device as an example. It would be sufficient if an operation result generation device physically generates an operation result, and if this operation result can be used for a game. For example, if an operation result generation device is a disc rotation device that rotates a disc, information on a position at which the disc halts after rotation can be used in a game. If an operation result generation device is a die throwing device that throws a die with surfaces assigned with symbols such as numerals or the like, information on a symbol on the surface that faces up when the die has come to rest can be used in a game. Furthermore, while the operation result is detected using a detection means, the detection means may be, for example, a physical detection means, such as a switch, an optical detection means, such as a camera, or a magnetic detection means, such as a magnetic sensor.

A movement image of the operation result generation device is a moving image that captures all or some of a process of the operation result generation device performing a predetermined operation. The movement image need not be an image captured continuously, and it may be an image captured non-continuously. Examples of the movement image include a captured moving image of a process of a ball falling into a pocket in a case of a ball lottery device, a captured moving image of a process of a disc coming into halt at a certain position in a case of a disc rotation device, and a captured moving image of a process of a dice coming into rest with one surface thereof facing up in a case of a die throwing device. A movement image of a predetermined unit of the operation result generation device means a captured moving image of a process of the operation result generation device performing a predetermined operation, from a capture start reference time point to a capture end reference time point. The capture start reference time point and the capture end reference time point are set, as appropriate, depending on a kind of operation result generation device, a kind of game, etc.

As described above, a game apparatus 30 according to the embodiment, etc., includes: a moving image acquirer 361 configured to acquire a movement image of an operation result generation device (e.g., common lottery devices 231 to 233 and a local lottery device 330) that generates an operation result used in a game; a movable display device 400 having a transformable display surface 410; a game related information acquirer 362 configured to acquire game related information including at least one of information on the operation result generation device and information on the game; and a form determiner 363 configured to determine a form of the display surface 410 based on the game related information, and the moveable display device 400 displays the movement image acquired by the moving image acquirer 361 in the form determined by the form determiner 363.

In this game apparatus 30, the movement image is displayed on the display surface 410, which is in a form changed based on the game related information. As a result, while using operation results of physical mechanism, problems such as structural complexity and large housing size can be reduced.

The display surface 410 may be divided into a plurality of blocks (e.g., a central part 412, an inner ring part 414, an outer ring part 416, and a side part 418), and at least one or all of the plurality of blocks may be movable. The movable display device 400 may include a projector 450 configured to project the movement image onto the display surface 410, and a moving direction of each block may include a direction component of the projection. The moving direction of each block is in the projection direction in that way, whereby the occurrence of a shadow accompanying moving of the blocks can be reduced.

The game related information may include information indicative of one or more from among a type of game, a type of operation result generation device, a progress status of game, and an operation state of operation result generation device, and the form determiner 363 may determine the form of the display surface in accordance with the information indicative of one or more from among a type of game, a type of operation result generation device, a progress status of game, and an operation state of operation result generation device.

The game related information may include information indicative of one or more from among a type of game, a type of operation result generation device, a progress status of game, and an operation state of operation result generation device, and the form determiner 363 may determine a form of each of at least one or all of the plurality of blocks in accordance with the information indicative of one or more from among a type of game, a type of operation result generation device, a progress status of game, and an operation state of operation result generation device.

A game apparatus 30 according to another mode of the present invention includes: a moving image acquirer 361 configured to acquire a plurality of movement images of a predetermined unit of an operation result generation device (e.g., common lottery devices 231 to 233 or a local lottery device 330) that generates an operation result; a moving image designation information acquirer 366 configured to acquire moving image designation information designating a movement image to be displayed in common among a plurality of game apparatuses 30 related to a common game in which the operation result is used; a moving image display device (e.g., a movable display device 400) configured to, from among the plurality of movement images of a predetermined unit acquired by the moving image acquirer, display the movement image designated in the moving image designation information; and a common game executor 367 configured to execute the common game in conformity with display of the movement image.

In this game apparatus 30, from among a plurality of downloaded movement images of a predetermined unit, a movement image designated in the moving image designation information is played. Accordingly, it is possible to make the common game less likely to be affected by network conditions in progressing a game in which the players of the plurality of game apparatuses 30 participate.

The moving image display device may display the movement image designated in the moving image designation information at a timing common to the plurality of game apparatuses 30. An acquisition status transmitter 368 that transmits an acquisition status of movement images to a game progress control apparatus (e.g., a common game server 10) that controls progress of the common game may be included, and the movement image designated in the moving image designation information may be a movement image selected by the game progress control apparatus based on the acquisition statuses of movement images collected from the plurality of game apparatuses 30. The acquisition status transmitter 368 may be configured to transmit the acquisition status of movement images to the game progress control apparatus in a case in which participation in the common game is permitted by the game progress control apparatus.

A game progress control apparatus (e.g., a common game server 10) according to another mode of the present invention includes: an acquisition status receiver 161 configured to receive an acquisition status of movement images of a predetermined unit of an operation result generation device (e.g., common lottery devices 231 to 233 or a local lottery device 330) that generates an operation result, from each of a plurality of game apparatuses 30 related to a common game in which the operation result is used; and a moving image designation information transmitter 162 configured to identify a movement image to be displayed in common among the plurality of game apparatuses 30 based on the acquisition status of movement images received from each of the plurality of game apparatuses 30, and transmit to the plurality of game apparatuses 30 moving image designation information designating the identified movement image.

A game system 1 according to another mode of the present invention includes a moving image storage apparatus (e.g., a common lottery game data center 20), a game progress control apparatus (e.g., a common game server 10), and a plurality of game apparatuses 30, the moving image storage apparatus, the game progress control apparatus, and the plurality of game apparatuses 30 being connected with each other via a network, and the moving image storage apparatus stores a plurality of movement images of a predetermined unit of an operation result generation device (e.g., common lottery devices 231 to 233 or a local lottery device 330) that generates an operation result, each of the plurality of game apparatuses 30 acquires a plurality of movement images of a predetermined unit from the moving image storage apparatus, the game progress control apparatus identifies a movement image to be displayed in common among the plurality of game apparatuses 30 and transmits to the plurality of game apparatuses 30 moving image designation information designating the identified movement image, and each of the plurality of game apparatuses 30 displays the designated movement image from among the acquired plurality of movement images of a predetermined unit and executes a common game in conformity with display of the movement image.

A game apparatus 30 according to yet another mode of the present invention includes: a moving image acquirer 361 configured to acquire a movement image of an operation result generation device (e.g., common lottery devices 231 to 233 or a local lottery device 330) that generates a physical operation result; a moving image display device 382 configured to display a moving image based on the movement image acquired by the moving image acquirer 361; an input receiver 381 configured to receive an operation input by a player; an attribute setter 371 configured to set an attribute (e.g., a number) in accordance with the operation input by the player, at least in a partial region of the movement image acquired by the moving image acquirer 361 (e.g., a region of one or more pockets 238 or 338 of a lottery moving image); a result information acquirer 372 configured to acquire information indicative of the physical operation result; and a game result generator 373 configured to generate a game result for the player based on the information acquired by the result information acquirer 372 and the attribute set by the attribute setter 371.

In this game apparatus 30, in a case in which a game is executed using the result generated by the operation result generation device, an attribute can be set at least in a partial region of the movement image in accordance with the operation input by the player. Therefore, in the game in which the operation result of the operation result generation device is used, the player can play in accordance with intentions.

The moving image display device 382 may display the movement image acquired by the moving image acquirer 361 in association with information on the attribute set in accordance with the operation by the player. The attribute setter 371 may change the attribute set in the partial region of the movement image in accordance with the operation input by the player (e.g., change a number in a region of a pocket 238 or 338, or switching numbers in regions of a plurality of pockets 238 or 338). The attribute setter 371 may add an attribute to the partial region of the movement image in accordance with the operation input by the player (e.g., add a number to a region of a pocket 238 or 338). The attribute setter 371 may change an area of a region in which to set an attribute in the movement image (e.g., the number of freight cars of the freight train M shown in FIG. 15), in accordance with the operation by the player. The attribute setter 371 may set an attribute in accordance with an operation input by the player in a case in which a predetermined game condition is satisfied (e.g., in a case in which a thinking time has arrived, and in a case in which predetermined credit and/or item is used).

In the above description, hardware and software constituting a game apparatus 30 realizes respective functions of a moving image acquirer 361, a movable display device 400, a game related information acquirer 362, and a form determiner 363; however, hardware and software of one or more devices separate from the game apparatus 30 may realize at least one or all of the functions described above. In this case, the functions may be said to be realized not as a "game apparatus" but as a "display system". That is, the display system includes: a moving image acquirer configured to acquire a movement image of an operation result generation device (e.g., common lottery devices 231 to 233 or a local lottery device 330) that generates an operation result used in a game; a movable display device having a transformable display surface; a game related information acquirer configured to acquire game related information including at least one of information on the operation result generation device and information on the game; and a form determiner configured to determine a form of the display surface based on the game related information, and the movable display device displays the movement image acquired by the moving image acquirer in the form determined by the form determiner.

The present invention may also be understood as a computer program for causing one or more computers (a game machine controller 360, a station controller 370, or the like) in the game apparatus 30 described above to function as the respective elements of the game apparatus 30 described above, or as a computer-readable recording medium having recorded therein the computer program. Furthermore, the present invention may also be understood as a computer program for causing one or more computers in the display system described above to act as respective elements of the display system described above, or as a computer-readable recording medium having recorded therein the computer program. The recording medium is, for example, a non-transitory recording medium, and in addition to optical recording media, such as a CD-ROM, may encompass semiconductor recording media, or freely selected known recording media, such as magnetic recording media. Moreover, the present invention may also be specified as an operation method of the game apparatus of the modes described above (moving image display control method), or as an operation method of the display system of the modes described above (moving image display control method).

DESCRIPTION OF REFERENCE SIGNS

1: game system
10: common game server
20: common lottery game data center
30: game apparatus
161: acquisition status receiver
162: moving image designation information transmitter
361: moving image acquirer
362: game related information acquirer
363: form determiner
366: moving image designation information acquirer
367: common game executor
368: acquisition status transmitter
371: attribute setter
372: result information acquirer
373: game result generator
381: input receiver
382: moving image display device

What is claimed is:
1. A game apparatus comprising:
a memory configured to store one or more instructions; and
at least one processor configured to execute the one or more instructions to:
acquire a movement image of an operation result generation device that generates a physical operation result of selecting one or more physical regions from among a plurality of physical regions;
control a display device of each player station to display a moving image based on the acquired movement image such that the display device is caused to display a superimposed moving image in which an image showing a sign assigned to each of the plurality of physical regions is superimposed on top of the movement image of the operation result generation device,
receive an operation input, from a player, of assigning one or more symbols on one or more physical regions among the plurality of physical regions;
set the one or more symbols in accordance with the operation input by the player, in the one or more of the physical regions displayed in the moving image;
acquire information indicative of the operation result of selecting the physical region; and
generate a game result for the player based on the acquired information and setting content based on the symbol set in accordance with the operation input by the player.

2. The game apparatus according to claim 1, wherein the at least one processor is further configured to control the display to display the movement image acquired by the moving image acquirer in association with information of the a symbol set in accordance with the player operation, as the moving image based on the movement image.

3. The game apparatus according to claim 1, wherein the at least one processor is further configured to change a symbol set in the one or more of the physical regions displayed in the movement image in accordance with the operation input by the player.

4. The game apparatus according to claim 1, wherein the at least one processor is further configured to add a symbol to the one or more of the physical regions displayed in the movement image in accordance with the operation input by the player.

5. The game apparatus according to claim 1, wherein the at least one processor is further configured to change an extent of the physical region in which to set a same symbol in the movement image, in accordance with the player operation.

6. The game apparatus according to claim 1, wherein the at least one processor is further configured to set a symbol in accordance with the operation input by the player in a case in which a predetermined game condition is satisfied.

7. A non-transitory computer readable medium storing a computer program for causing one or more computers to perform a method comprising:
acquiring a movement image of an operation result generation device that generates a physical operation result of selecting one or more physical regions from among a plurality of physical regions;
controlling a display device of each player station to display a moving image based on the acquired movement image such that the display device is caused to display a superimposed moving image in which an image showing a sign assigned to each of the plurality of physical regions is superimposed on top of the movement image of the operation result generation device;
receiving an operation input, from a player, of assigning one or more symbols on one or more physical regions among the plurality of physical regions;
setting the one or more symbols in accordance with the operation input by the player, in the one or more of the physical regions displayed in the moving image;
acquiring information indicative of the operation result of selecting the physical region; and
generating a game result for the player based on the acquired information and setting content based on the symbol set in accordance with the operation input by the player.

8. A method for operating a game apparatus comprising:
acquiring a movement image of an operation result generation device that generates a physical operation result of selecting one or more physical regions from among a plurality of physical regions;
controlling a display device of each player station to display a moving image based on the acquired movement image such that the display device is caused to display a superimposed moving image in which an image showing a sign assigned to each of the plurality of physical regions is superimposed on top of the movement image of the operation result generation device;
receiving an operation input, from a player, of assigning one or more symbols on one or more physical regions among the plurality of physical regions;
setting the one or more symbols in accordance with the operation input by the player, in the one or more of the physical regions displayed in the moving image;
acquiring information indicative of the operation result of selecting the physical region; and
generating a game result for the player based on the acquired information and setting content based on the symbol set in accordance with the operation input by the player.

* * * * *